United States Patent
Kewitsch et al.

(10) Patent No.: US 10,345,526 B2
(45) Date of Patent: Jul. 9, 2019

(54) HIGH RELIABILITY ROBOTIC CROSS-CONNECT SYSTEMS

(71) Applicant: Telescent Inc., Santa Monica, CA (US)

(72) Inventors: Anthony Kewitsch, Santa Monica, CA (US); Don Zambos, Marina del Rey, CA (US)

(73) Assignee: Telescent Inc., Irvine, CA (US)

( * ) Notice: Subject to any disclaimer, the term of this patent is extended or adjusted under 35 U.S.C. 154(b) by 331 days.

(21) Appl. No.: 14/949,861

(22) Filed: Nov. 23, 2015

(65) Prior Publication Data

US 2016/0202424 A1 Jul. 14, 2016

Related U.S. Application Data

(60) Provisional application No. 62/091,541, filed on Dec. 14, 2014.

(51) Int. Cl.

| | |
|---|---|
| G02B 6/35 | (2006.01) |
| B25J 15/02 | (2006.01) |
| B25J 9/02 | (2006.01) |
| B25J 18/02 | (2006.01) |
| G02B 6/44 | (2006.01) |
| G02B 6/38 | (2006.01) |
| B25J 9/00 | (2006.01) |
| B25J 9/10 | (2006.01) |

(52) U.S. Cl.
CPC .......... *G02B 6/3508* (2013.01); *B25J 9/0018* (2013.01); *B25J 9/023* (2013.01); *B25J 9/104* (2013.01); *B25J 15/02* (2013.01); *B25J 18/025* (2013.01); *G02B 6/3502* (2013.01); *G02B 6/356* (2013.01); *G02B 6/3866* (2013.01); *G02B 6/358* (2013.01); *G02B 6/359* (2013.01); *G02B 6/3556* (2013.01); *G02B 6/3564* (2013.01); *G02B 6/3568* (2013.01); *G02B 6/3572* (2013.01); *G02B 6/385* (2013.01); *G02B 6/4452* (2013.01)

(58) Field of Classification Search
None
See application file for complete search history.

(56) References Cited

U.S. PATENT DOCUMENTS

| | | | | |
|---|---|---|---|---|
| 6,973,251 B2* | 12/2005 | Morellec | ............ | G02B 6/3897 385/135 |
| 8,290,327 B2* | 10/2012 | Chen | ............ | B08B 11/00 385/134 |
| 8,419,465 B2* | 4/2013 | Jacks | ............ | H01R 13/641 439/491 |
| 8,463,091 B2* | 6/2013 | Kewitsch | ............ | G02B 6/3502 385/134 |
| 9,866,458 B2* | 1/2018 | Jacks | ............ | H04L 43/0811 |

(Continued)

*Primary Examiner* — Michelle R Connelly
(74) *Attorney, Agent, or Firm* — Stritzky Law, PLLC

(57) ABSTRACT

Mechanisms and designs of large scale, modular, robotic software-defined patch-panels incorporate numerous features that ensure reliable operation. A telescopic arm assembly (104) with actuated gripper mechanism (103) is used to transport internally latching connectors (101) within a stacked array of translatable rows (102). A unique two-state magnetic latching feature provides reliable, low loss optical connections. Flexible, magnetically levitated internal structures are provided to assist the robot in automatically aligning to, engaging, and disengaging any internal connection in a fast reliable process within the stacked array.

23 Claims, 29 Drawing Sheets

(56) References Cited

U.S. PATENT DOCUMENTS

| | | | |
|---|---|---|---|
| 2004/0076377 A1* | 4/2004 | Mizukami | G02B 6/3807 385/77 |
| 2010/0220953 A1* | 9/2010 | Kewitsch | G02B 6/3502 385/17 |
| 2012/0189247 A1* | 7/2012 | Chen | G02B 6/3508 385/22 |

* cited by examiner

HIGH RELIABILITY ROBOTIC CROSS-CONNECT SYSTEMS

BACKGROUND OF THE INVENTION

1. Field of the Invention

The present invention is directed in general to large scale robotic cross-connect systems providing low loss, software-defined fiber optic connections between a large number of pairs of ports. Mechanisms in the systems incorporate numerous features that ensure reliable operation.

2. Description of the Background Art

Large scale automated fiber optic cross-connect switches and software-defined patch-panels enable data centers and data networks to be fully automated, wherein the physical network topologies are software-defined or programmable, for improved efficiencies and cost savings. Current fiber optic switch technologies such as cross-bar switches scale as $N^2$ (N is the number of ports) making them ill-suited for large scale production networks. Prior art disclosures of cross-bar switches include U.S. Pat. No. 4,955,686 to Buhrer et al, U.S. Pat. No. 5,050,955 to Sjolinder, U.S. Pat. No. 6,859,575 to Aral et al, and U.S. Patent No. 2011/0116739A1 to Safrani et al.

More recent automated patch-panel approaches that scale as linearly with the number of ports utilize braided fiber optic strands. Advances in the mathematics of topology and Knot and Braid Theory (U.S. Pat. Nos. 8,068,715, 8,463,091, 8,488,938 and 8,805,155 to Kewitsch) have solved the fiber entanglement challenge for dense collections of interconnect strands undergoing arbitrary and unlimited reconfigurations. Since this Knots, Braids and Strands (KBS) technology scales linearly in the number of interconnect strands, significant benefits over cross-bar switches such as density and hardware simplicity are realized. Existing systems featuring autonomous patch panel systems and implementing KBS algorithms in accordance with the Kewitsch patents referenced above typically utilize a pick and place robotic actuation system with a gripper at the end of the robotic arm to grab and transport a fiber optic connector and the fiber optic strand extending therefrom to a central backbone in the system. The robotic arm is of a narrow width and extended depth to allow it to descend into the dense fiber optic interconnect volume with no mechanical interference and no contact with surrounding fibers, yet still having sufficient rigidity to experience minimal deflection under transverse forces including magnetic repulsion and tension originating from the fiber being carried in the gripper therein. However, further improvements in this new class of physical fiber optic switching or connection management system are always desirable, including those relating to improvements in compactness, hardware simplicity and operative reliability, singly or in combination.

SUMMARY OF THE INVENTION

The present invention relates to apparatus to improve the performance of this new type of cross-connect utilizing braided fiber optic strands and the application of the mathematics of topology to this scaling challenge. In this invention, a highly reliable automated cross-connect system is employed with multiple unique hardware and operative features to provide superior compactness, performance and reliability. For example, a dense three-dimensional matrix of parallel and precisely separated connector elements is distributed through two orthogonal dimensions, with a plurality of multi-functional elements being disposed along each connection path in the third dimension. The connector paths each comprise individual ones of a plurality of linear base elements which are each separately movable to align with a chosen base element in the cross-connect system. The invention includes unique magnetically latched fiber optic connector devices which enable the system to provide multiple different user defined states of insertion loss. The devices include reliable, self-guiding, attraction mode magnetic latching to facilitate repeatable robotic engagement and reconfiguration. Robotic miniature gripper devices that retain the magnetically latched fiber optic connectors are further disclosed, wherein the miniature gripper includes integral sensing and actuation means to ensure proper engagement with a selected connector. Furthermore, the system is configured with movable rows of multiple, spaced apart horizontal connector receptacles, stacked vertically therein. Each row is comprised of multiple parallel connector tracks, and each connector track includes a mating connector receptacle, a fiber optic interface port, and combined mechanical and magnetic reference features which are configured to achieve reliable latching and locating of both the fiber optic connector device and the gripper device. The movable rows of connector receptacles incorporate precision injection molded translation assemblies and actuation means to accurately and precisely translate rows between one of three horizontal locations. These locations generate the vertical row shuffling response as dictated by the KBS algorithm and aid in improving the volumetric efficiency of the system.

The gripper consists of a two-part body, a central body which mechanically engages or interlocks with a particular target connector extended member in between the multiplicity of surrounding extended members, and a driven, translatable outer body or frame incorporating means to engage and sense the reconfigurable internal fiber optic connector assembly. The narrow width gripper, attached to the lower end of the controlled telescopic arm, descends down onto a selected centered connector row until a gripper interlock sensor detects proper engagement with the extended member. The gripper outer body translates parallel to the extended member to plug-in, unplug or partially disconnect the internal connector assembly. The translation mechanism uniquely incorporates a drive line, wrapped around a motor drive shaft with a small but precise excess length to control bidirectional lateral translation of the gripper. This obviates the stalling of the drive motor upon a startup acceleration from a state of rest.

The cross-connect system is also based on a three-dimensional array of parallel but precisely laterally separated elongated reference members disposed in an augmentable vertical stack of horizontal rows. The reference members are narrow and of selected uniform length having chosen flexure properties, and include sets of small permanent magnets deployed so as to utilize both magnetic attraction and repulsion forces during different and separate operative states of engagement. Each narrow reference member is positioned to be closely adjacent to a different receiving aperture into which the end of a different optical fiber connector can be inserted. The end apertures lie in transversely disposed horizontal rows in a vertical connection plane and each is positioned to potentially receive the end of the optical fiber connector repositioned by the system. The small permanent magnets along their lengths are positioned selectively and with such polarities as to provide at least two stable insertion positions and also a transversely repulsive force, to maintain adjacent elements separate in a dense three-dimensional array of elements.

This application further discloses a uniquely compact configuration for accessing and repositioning optical fibers on command. Telescopic robotic arm devices of minimal transverse compliance and high length efficiency (ratio of the range $L_2$ to retracted height $L_1$), independent of extended length (zero to $L_2$) are achieved by deployment of a unique vertical telescoping structure that is horizontally movable from one connector track, through surrounding fibers and to another connector track under the direction of the KBS algorithm. The two-stage telescopic arm arrangement is based on chosen linear lengths of a vertical rectangular tube or "C" shaped outer body, with an internal slider body maintained in alignment by a unique sliding bearing carriage and spring preloading arrangement within the telescopic arm. The arrangement enables a constant length, flat, flexible electrical interface cable to be routed dynamically from the gripper mechanism to an external control system, which serves the dual purpose of pulling the internal sliding body, so it moves in synchronism with the outer body. The robotic arm and gripper configuration are of very narrow width, enabling it to move unencumbered throughout the limited spaces in the fiber interconnect volume.

An automated cleaning device is further described, with the additional feature of integral sensing of the force on the cleaning fabric and polished fiber optic connector ferrule during cleaning. The electrical signal produced therein is utilized to provide feedback to accurately control the robot position and maintain less than a maximum value of compressive force at the fiber end face. This precise control ensures repeatable, high quality cleaning of the fiber end face, preventing the accumulation of particulates to thereby achieve consistently low insertion loss, high return loss optical connectivity, for superior quality and consistency compared to present manual processes. In the fiber cleaning subsystem, the cleaning fabric is fed from a supply spool through the cleaning cassette pad and onto a dispense spool. The arrangement enables multiple fibers to be cleaned from a single supply spool.

Stacked planar arrays of optical fiber take-up spools with fibers dynamically routed through a combination of eyelets, guides and rollers distributed in a precisely spaced geometry provide a source of low loss optical fiber connections between a fixed input array and a physically changeable output array. Each spool is independently tensioned to the degree necessary to retract any excess length of fiber between the internal one-dimensional backbone and two-dimensional output connector array, without subjecting the fiber to excessively sharp bends resulting from the controlled tension, such that the reliability and optical transmission characteristics of the fiber are not compromised.

BRIEF DESCRIPTION OF THE DRAWINGS

FIG. 4 illustrates an exterior view of the same stacked arrangement of eight connector rows, producing the two-dimensional array of fiber optic ports to which external cables requiring cross-connections are plugged in;

DETAILED DESCRIPTION OF THE INVENTION

I. Robotic Cross-Connect System

Figure 1A:
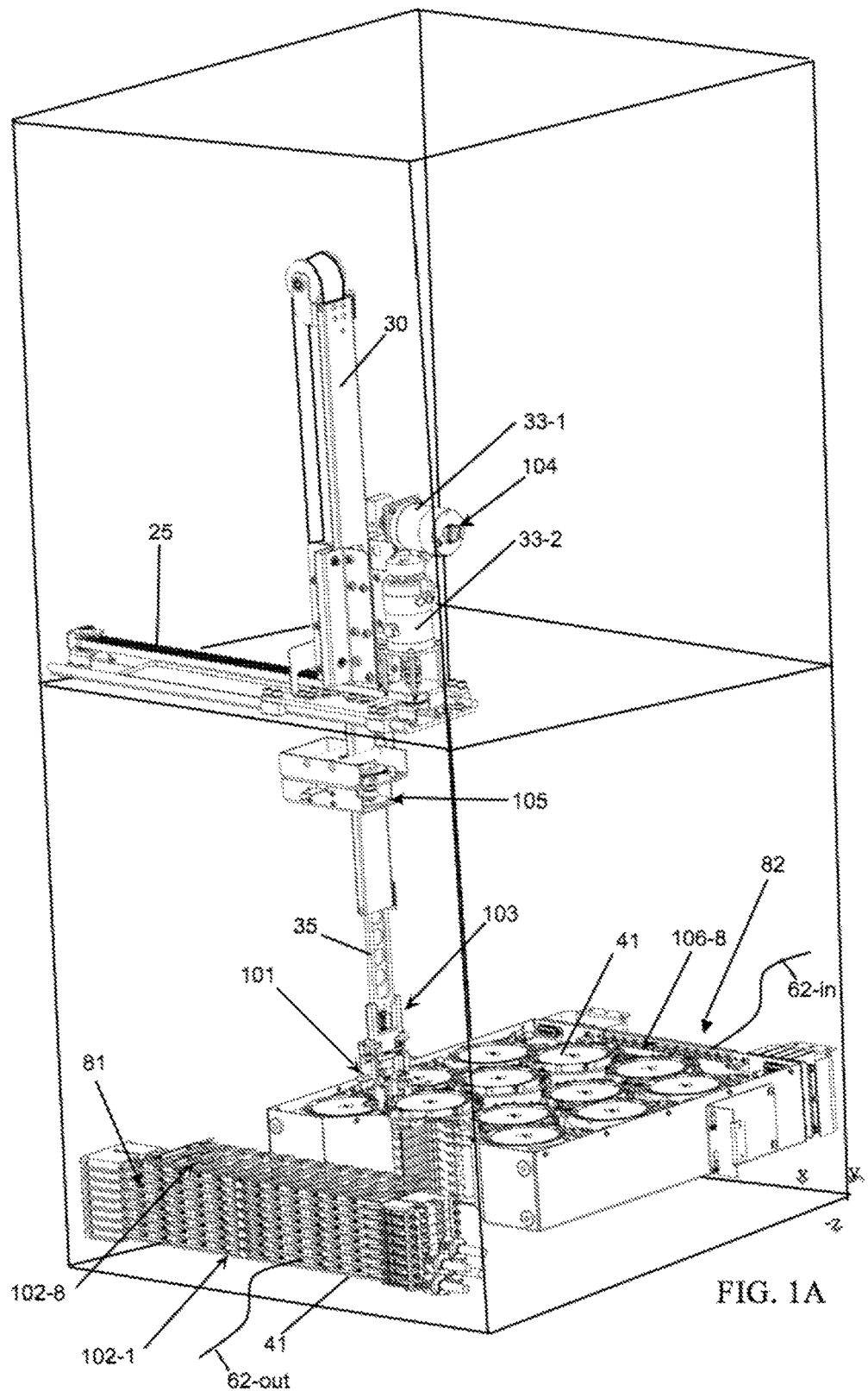
FIG. 1A depicts the arrangement of a number of significant functional elements comprising a robotic fiber optic cross-connect system in accordance with the present invention, populated with one set of eight rows and with capacity for adding more rows both below and above those eight rows as depicted.

This application discloses robotic cross-connect systems providing low loss, software-defined fiber optic connections between a large number of pairs of ports. The number of ports typically ranges from 48×48 up to 1008×1008 and beyond. FIGS. 1A-1D illustrate a number of principal aspects of this system, comprised of a robot module 112 including a telescopic two axis robot arm assembly 104, a fiber optic connector end face cleaning cartridge module 105, a miniature actuated gripper or gripper assembly 103, a stacked arrangement of connector rows 102-1 . . . 102-N, and a stacked arrangement of fiber take-up reel trays 106-1 . . . 106-N. Groups of connector rows 102-1 . . . 102-8 further comprise the front actuated patch-panel of fiber module 113. The gripper 103 is able to unplug any fiber connector 101-n from among the array of fiber connectors inserted along the connector rows 102, then transport it in a deterministic, optimal weaving pattern between the surrounding fiber connectors of the array upon manipulation by the robot arm assembly 104. The process of transport thus includes a coordinated, sequential, multi-step movement of the robot and programmatic shuffling of each connector row 102 in accordance with the KBS algorithm as described in U.S. Pat. No. 8,463,091 referenced above. Before plugging in the fiber connector 101-n to its chosen final port 55, the polished fiber end face of fiber connector 101-n may be cleaned by the fiber end face cleaning cartridge module 105 as shown generally in FIGS. 1 and 9 and described in detail below with respect to FIGS. 14 to 16B. The fiber connector 101-n terminates the internal optical fiber 52, wherein this optical fiber originates from an automatic, spring loaded take-up reel residing within the multiple take-up reel tray 106. The take-up reels ensure that all internal optical fibers are maintained under slight tension in the fiber interconnect volume between the connectors 101 and the take-up reels so that they follow substantially straight-line paths for all possible arrangements of connectors 101 within ports 55. Straight-line paths are efficiently represented mathematically and facilitate the routing by the KBS algorithm as described in the above referenced patents.

Figure 1B:
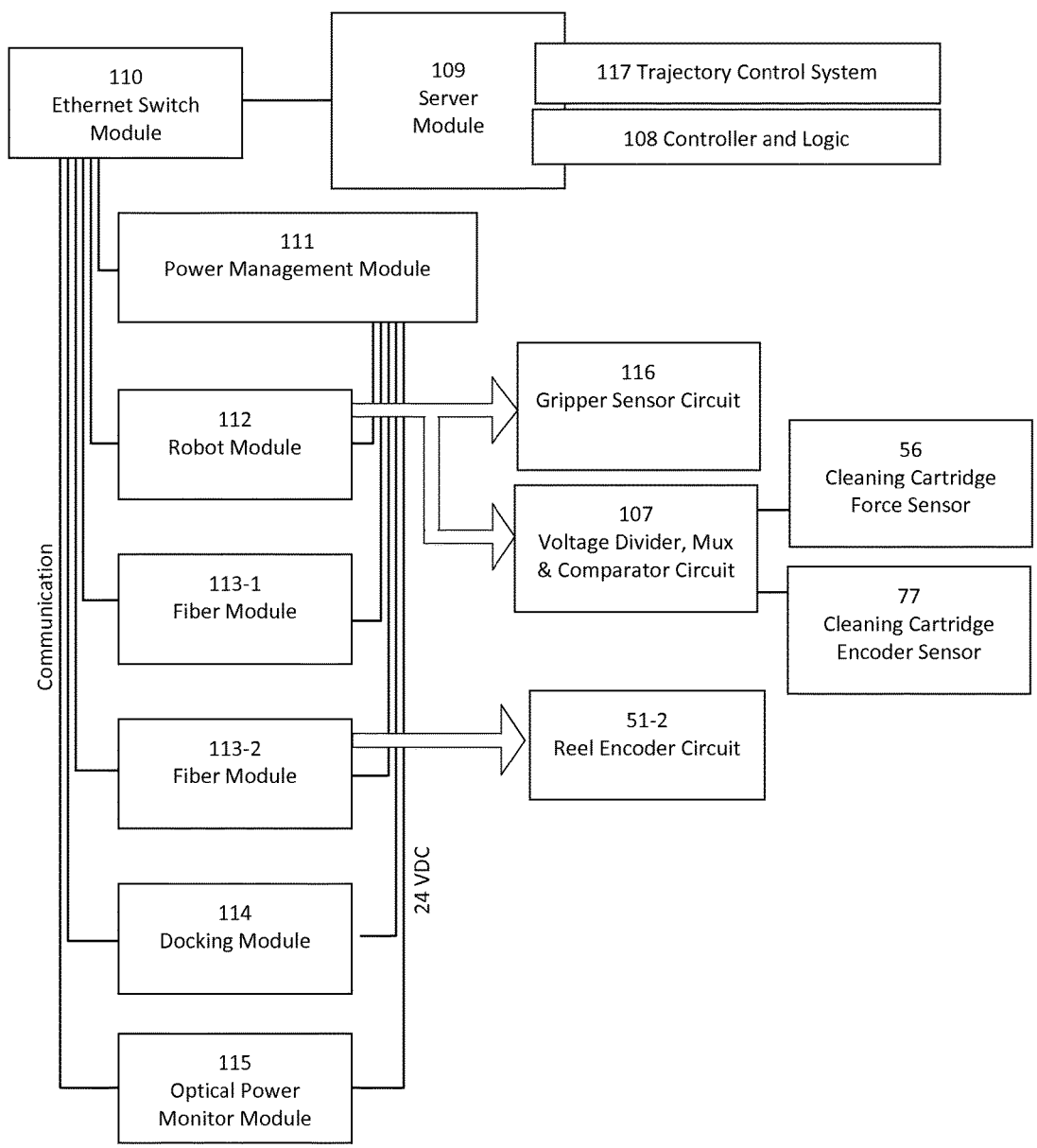
FIG. 1B is a block diagram of other inventive combinations in accordance with the invention.
Figure 1C:
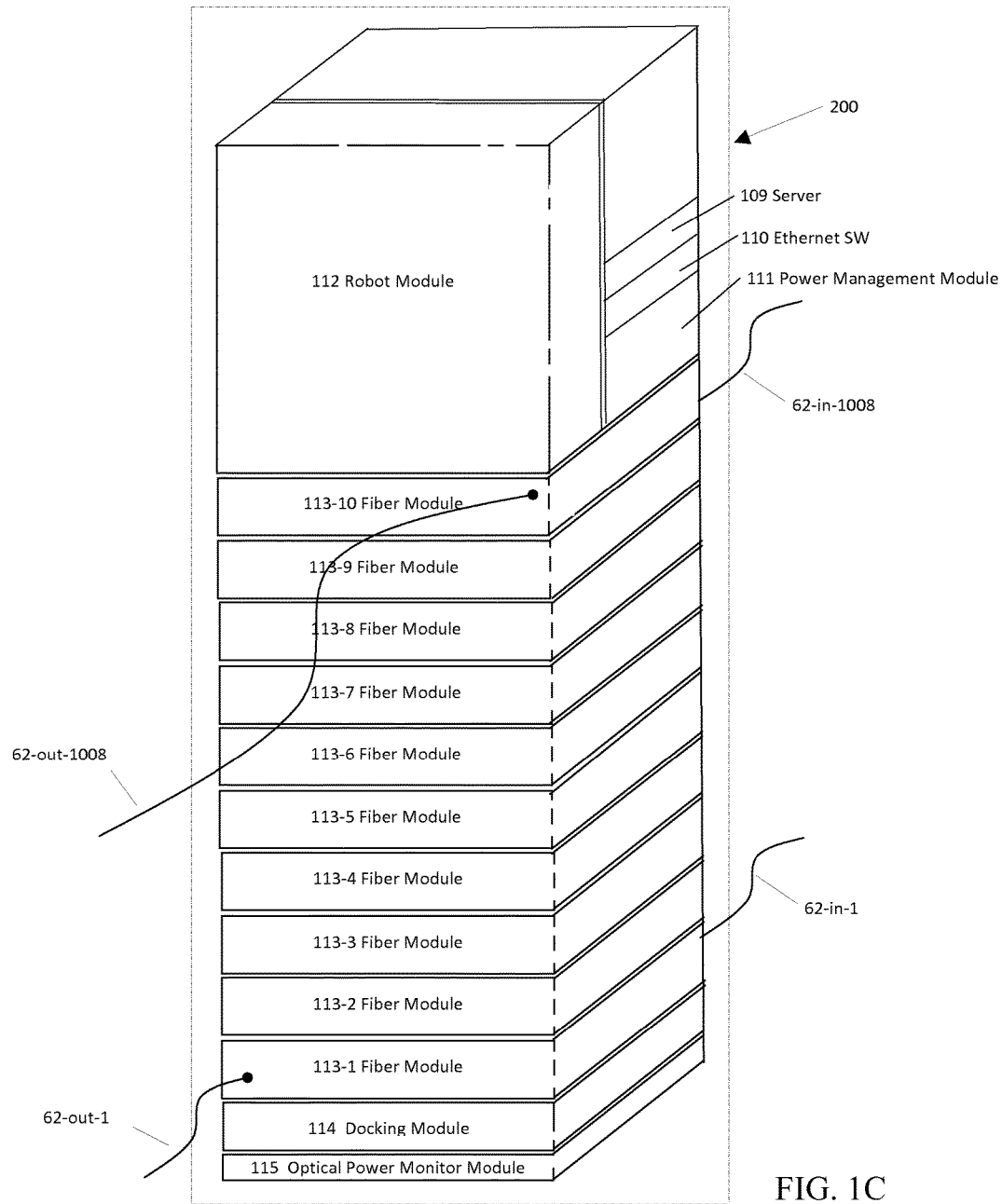
FIG. 1C is a simplified perspective view illustrating the arrangement of interrelated modules.
Figure 1D:
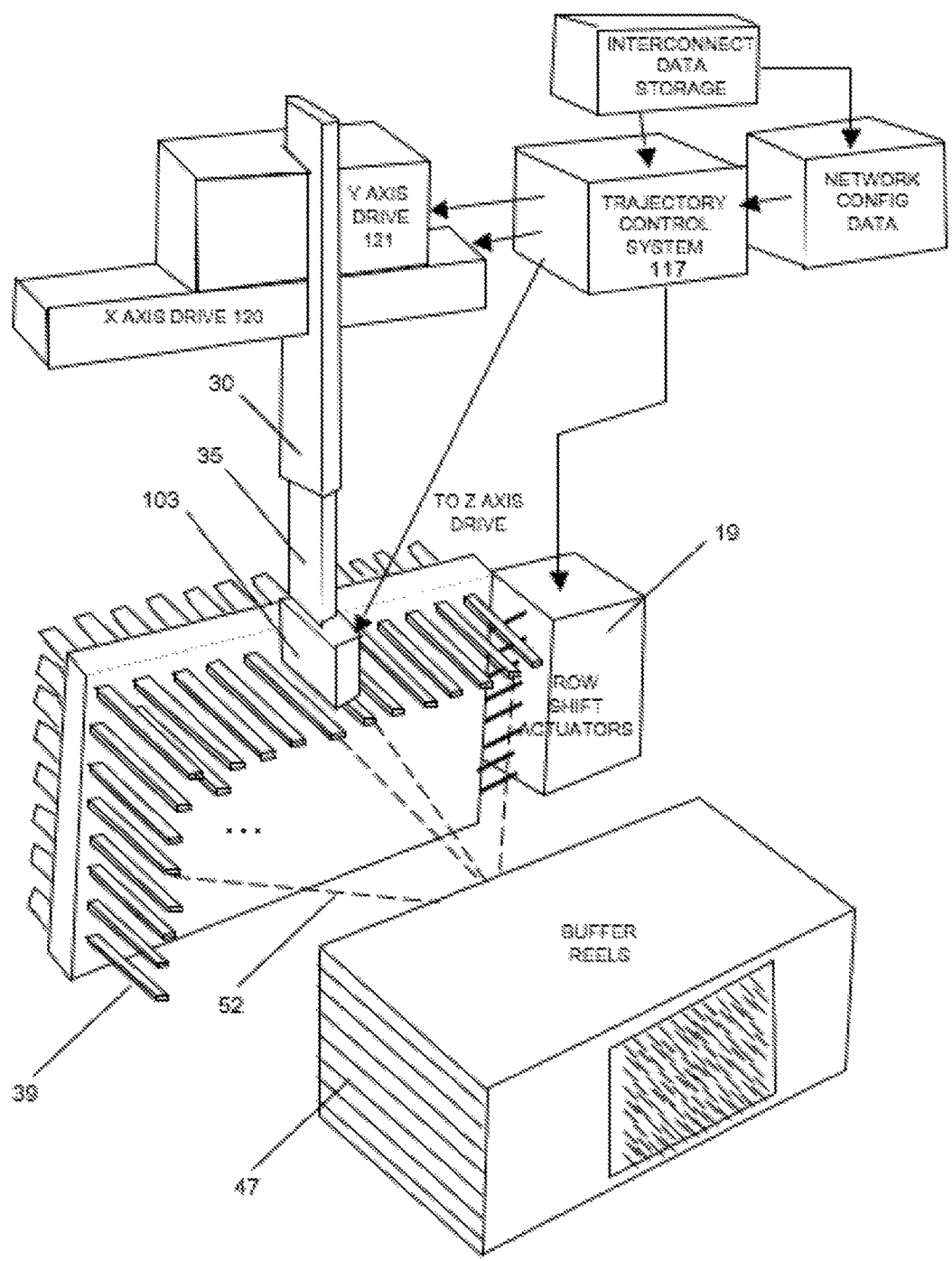
FIG. 1D is a block diagram of some interrelated system elements in accordance with this invention.

In reference to the block diagram in FIG. 1B and the perspective views in FIGS. 1C-1D, the KBS algorithm is implemented in software instructions residing on server module 109 and communicating in parallel with each Fiber Module 113-1 . . . 113-10, Docking Module 114, Optical Power Monitor Module 115, Robot Module 112, and Power Management Module 111 through the Ethernet Switch 110 and by use of the Ethernet protocol TCP/IP. In a further example, each module is powered by 24 VDC, which is supplied by a power distribution bus in the Power Management Module 111. The Robot Module 112 is in communication with a Gripper Sensor Circuit 116 to detect the operative state of the fiber connector in transport, as well as a comparator circuit for a force sensor 56 (e.g. a thin film resistive sensor) integral to the cleaning cartridge. The fiber modules 113 each are in communication with a multiplexed array of reel encoder sensors responsive to the rotation of any particular take up spool/reel 41, the rotation resulting from internal fiber length changes due to movement of the internal fiber connector.

FIGS. 1A, 1B, 1C further depict details of the integrated and cooperative relationship between several novel operative parts of this system, which further extend the art of automatic switching of selected ones of a plurality of optical fiber lines as described in the above-referenced Telescent patents. Inputs to the system comprise a plurality of lines 62-in (FIGS. 1A and 1C) distributed in ordered spaced apart columns and rows in a coupling plane, and spaced apart by a predetermined gap, fed into one side of each individual one of an array of two-sided optical couplers 18. They are then connected in the coupling plane with low loss internal fiber connectors to an opposing array 42 of input optical couplers, and connected to a plurality of lines 62-out at the opposite side of the patch panel system 200. The individual rows stacked orthogonally in a first direction and are separately incrementally shiftable laterally by one of a stack of row shift actuators in accordance with the fundamental Knots and Braids methodology (referenced above). Changeable lines/optical fibers 52 (FIG. 4) are coupled into the second side of the optical couplers 18 and these lines converge into a one-dimensional alignment at backbone 40 and are then distributed into ordered levels of multiple spools serving as buffer reels 41, as described below in more detail in relation to FIGS. 11 to 13. These reels 41 compensate for path length variations as internal fiber 52 positions and their corresponding suspended lengths are changed, without introducing curvatures in the optical fibers that are so sharp and noon-adiabatic that they would introduce light loss at bends. From the assembly of buffer or take-up reels 41 the fiber pattern is reconfigured, typically into an array of the linearly disposed receptacles or optical couplers 18, which can then be retransmitted or otherwise reconfigured as desired.

Given this context, some principal aspects of the present invention that are also shown in generalized form in FIG. 1A (although shown and discussed in more detail below) further establish the internal cooperative relationships in form and function. For example, the arrangement of rows and columns of two-sided couplers in the connector row assemblies 102 provide signal interchange between lines from opposite sides. On the internal, changeable side, the structures comprise individual linear fixed elements of predetermined length, cross-sectional configuration and flexibility. Each of these fixed elements also supports a pattern of small permanent magnets within its boundaries and adjacent its internal end as described in detail below with reference to FIGS. 2 to 4. In combination with this, each changeable optical fiber 52 in the system terminates in a connector row assembly 102 of approximately matching length for coupling to any individual fixed element 63 with which it is to be paired. When a terminal protruding end of ferrule 10 of the optical fiber 52 is inserted in the individual optical coupler 18 of the connector row assembly 102, an individual changeable optical circuit is completed. Together with a number of features described in detail hereafter, that pertain either or both to design and operative relationships, this concept and its implementation are unique.

Interrelated functions are provided in the system that pertain to the engagement and disengagement actuation operation as well as to the interchange of fibers to and from the couplers. Two different states of linear engagement and a related state of disengaged physical proximity are utilized, as is described in more detail below. These states are affected during a linear alignment phase independently of the repositioning of fibers by interweaving through the columns and rows as described in detail in the previously referenced patents.

These as well as other functions are affected by commands from a trajectory control system 117 (FIG. 1B) which receives cross-connect configuration information from a server module 109, and a source of updated data, based on stored interconnection data from a memory system in server module 109 holding updated data. Again, reference may be made to the patents mentioned above for a full understanding of the elements and relationships that are germane to positioning of the gripper assembly 103. These movements are substantial in orthogonal X and Y directions and also incremental in the Z dimension under commands to the activated gripper assembly 103 at the activator from the trajectory control system 117. For these functions the system 200 deploys a vertical multi-stage head positioner controlling movement in the Y axis, comprising a narrow rectangular hollow robot arm upper stage/outer stage 30 inside of which a linear and narrower lower section or inner stage 35 slides by spring-loaded rollers in a proportional ratio. Both receive command signals from the trajectory control system 117, and are driven by a Y axis drive 33-1, typically a brushless dc servomotor or stepper motor, responsive to command signals from the server module 109. The Y axis robot art outer and inner stages 30, 35 are moved horizontally as command signals are delivered from the trajectory control system 117 which activates the X axis drive motor 33-2. Most of this mechanism is positioned above the fiber interchange matrix, while the narrow fiber interchange head acting as a gripper 103 as discussed in detail below (FIGS. 5-7) is movable vertically in the spaces between the vertical column j of fibers 52 and indicated by 118-j in FIG. 3. The horizontal connector rows 102 of the interchange matrix are selectively moved incrementally in a first horizontal direction or oppositely during threading through the matrix. When the activated head of the gripper assembly 103 reaches a target location in a connector row 102, it can be moved incrementally along the Z axis to couple or decouple a target fiber connector 101 to the selected one of the optical couplers 18. Also, along the Z axis, it can shift the target connector incrementally between "allocate," (FIG. 5) "unallocate," (FIG. 6) and "unplugged" (FIG. 7) positions. The corresponding magnet interactions between the connector 101 magnet 13 and the row magnets 14, 15 are noted in FIG. 3.

Figure 2:
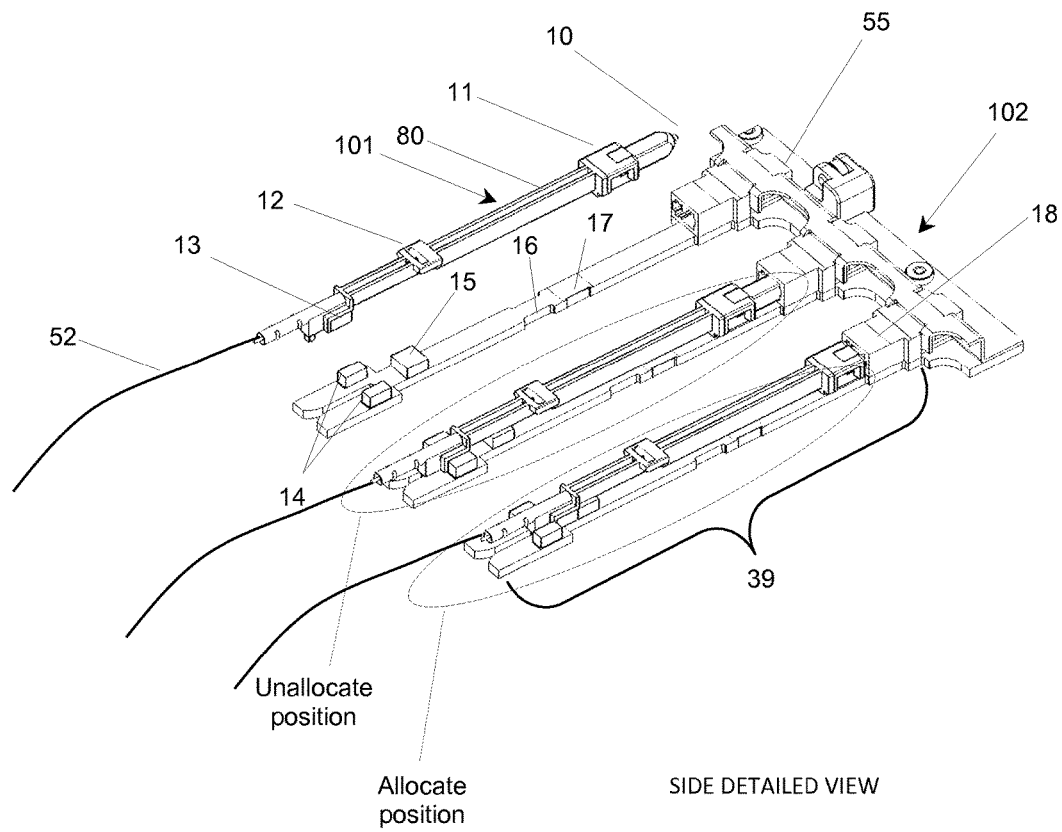
FIG. 2 depicts a fragmentary view of the magnetically latching internal fiber optic connector in accordance with the invention, including its features for interfacing and mating within the robotic gripper, its relationship to a connector row for receiving and holding the connector, and a side detailed view of the resulting magnetic repulsion forces between connector rows.
Figure 2:
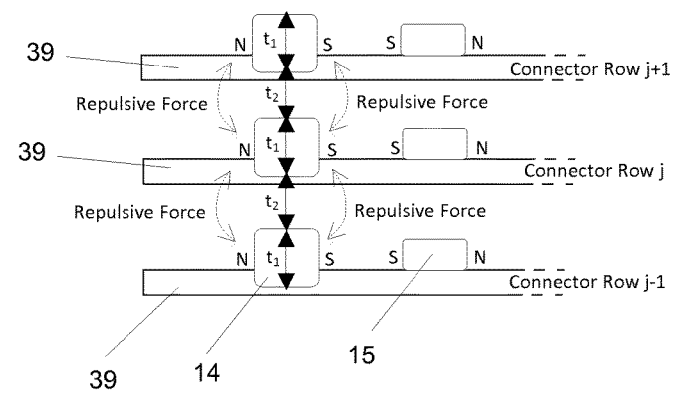
Figure 3:
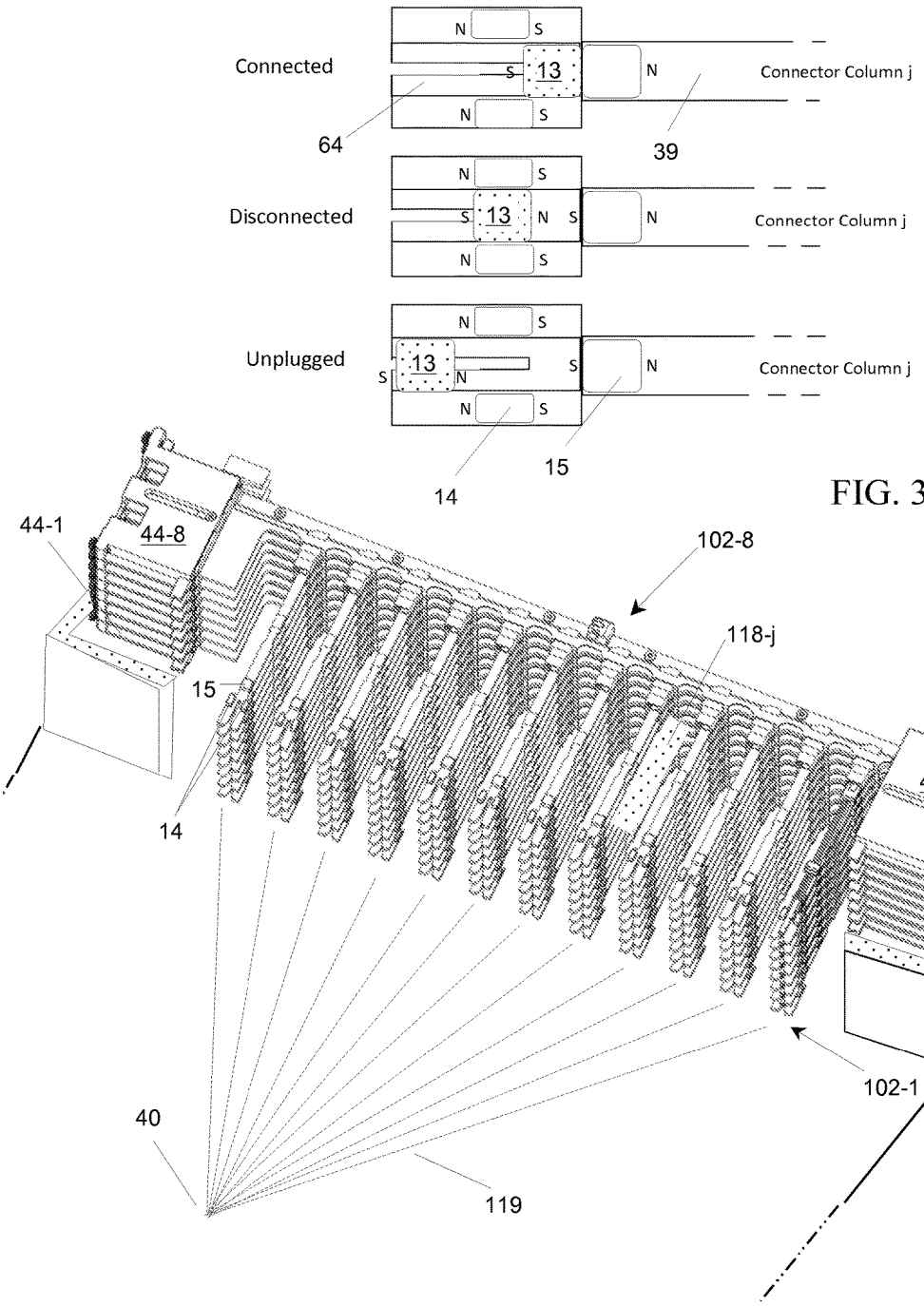
FIG. 3 is an interior view of a stacked arrangement of eight connector rows, forming a stackable module of 96 fiber optic ports with means to magnetically engage fiber optic connectors transported thereto by the gripper, further illustrating the relationship between the connector magnet and the connector row magnets with a tri-state configuration.
Figure 4:
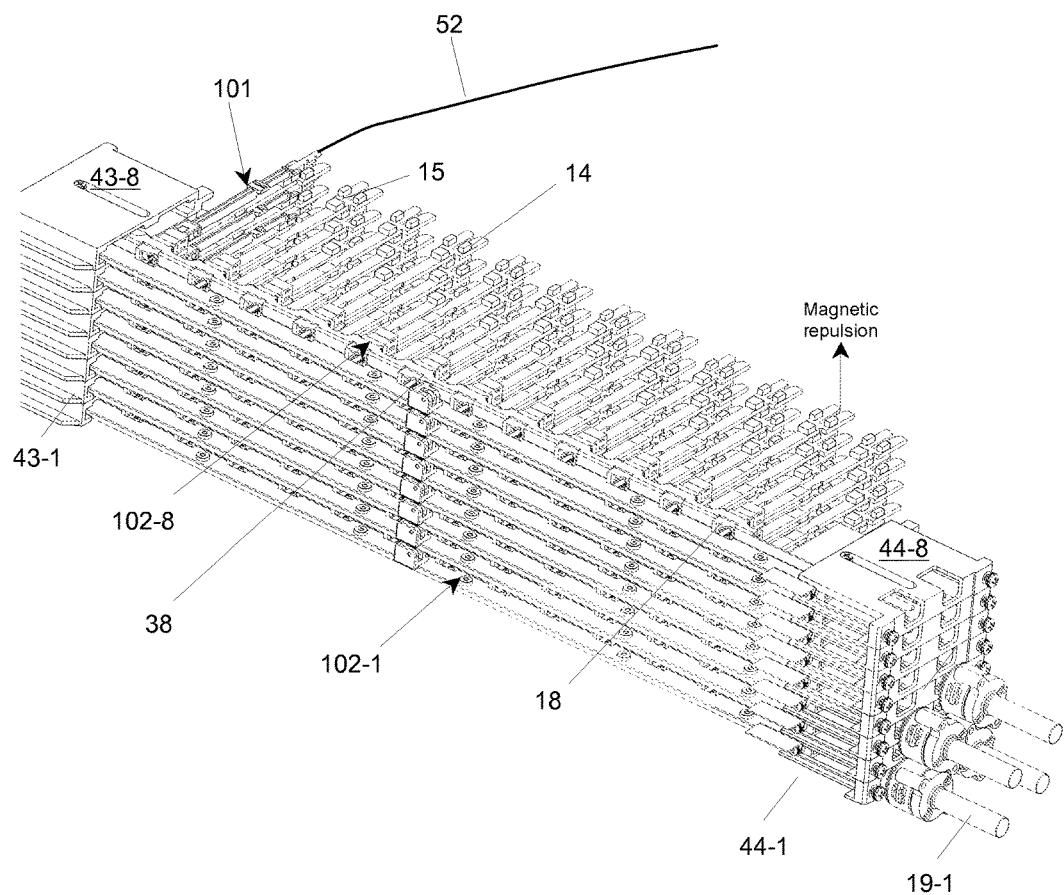

II. Two-Dimensional Array of Switchable, Magnetically Latched, Multi-State Fiber Optic Connectors This application further discloses a multi-dimensional array of fiber connector devices/assemblies 101 arranged in incrementally shiftable vertically spaced connector rows 102 (FIGS. 2-4) disposed in generally horizontally aligned columns as best seen in FIGS. 3 and 4. The horizontal rows, as best seen in FIG. 2, comprise a plurality of spaced apart parallel base elements each fixed at one end to a different optical coupler 18 which is to receive the terminal ferrule 10 of a different and changeable fiber optic line 52. Thus, the array in part comprises, as seen in the perspective views of FIGS. 1A, 3 and 4, a plurality of horizontally spaced fixed connector tracks or track elements 39 of selected flexibility and substantial length relative to their width and cross-sectional area. They are each fixedly attached at what can be called a receiver end to the transverse connector row assembly body 102, and thus provide parallel interactive elements for receiving the individual fiber optic connectors 101. These fixed connector track elements 39 have a length to width ratio of greater than 10:1, and are of substantially less height than width so they have resilience in a selected range, and no or low magnetic permeability, since magnetic forces are to be used for specific deflection purposes therewith, as described below.

Each optical fiber 52 in the system terminates in an elongated connector 101 leading to a ferrule 10 that engages in the optical coupler 18. When fully inserted, the optical fiber terminus defined by the ferrule 10 is in physical and optical contact with an external fiber terminus pre-existing in the opposite side of the two-sided optical coupler 18 and in parallel adjacency to the fixed element of the connector track 39. As seen in the three different and adjacent insertion positions for the fiber ferrule 10 depicted in the partially exploded and fragmentary perspective view of FIG. 2, a detachable portion of the connector 101 extends from the ferrule 10 at the inserted end through a shaped, slightly larger housing 11 which limits the depth of insertion of ferrule 10 in the optical coupler 18 and provides the means to engage within a matching receptacle in underside of gripper 103. The removable part further includes an intermediate section of elongated U-shaped housing 80 of a predetermined length that provides an external wall that substantially surrounds and protects the optical fiber 52. This housing member 80 encompasses an internal length of optical fiber that couples at one end to the ferrule 10 and merges at the other end with an individual different optical fiber 52 in the system. The movable connector 101 also includes a gripper latch receiving element 12 intermediately positioned along its length and a small magnet 13 of high permanent magnetic field strength at a predetermined substantial spacing from its terminal ferrule 10 which provides cooperative functions described in detail below.

The connector 101 also provides predetermined optical, mechanical and magnetic interaction with the system in general and with each different adjacent elongated fixed connector track element 39 in particular. Since, as seen in FIG. 2, each such fixed connector track element 39 extends from the underside of an optical coupler 18 in parallel adjacency to a movable fiber optic connector 101 therein, it incorporates a number of cooperative features along its length. Starting from the free end, the fixed element comprises a pair of bifurcated end sections serving as supportive bases for two small permanent magnets 14, of the same selected polarity, at like distances from the optical coupler 18 end. These may be termed the "unallocate" magnets, to designate their operative function, while a third magnet 15 is centered on the elongated body at a predetermined small lengthwise spacing from the magnet pair 14, and may be termed the "allocate" magnet. The third "unplugged" state shown in FIG. 3 is one that exhibits little magnetic attraction between the inserted magnet 13 and any of the magnets 14 and 15 in the fixed element. The fixed member/connector track element 39 also includes a short, slightly narrowed docking section 16 intermediate its length, and an adjacent reflector surface 17 that can be used in positioning.

The three different positions of relative engagement of the connector 101 are depicted in FIGS. 2 and 3. The "allocate"

state, as used herein refers to a relationship in which the ferrule 10 of the fiber connector 101 is fully engaged within the mating sleeve of the optical coupler 18. The term "unallocate" refers to the state wherein the fiber connector is partially engaged within the mating optical coupler 18. The "allocate" state produces near zero insertion loss and the "unallocate" state produces about 20 dB or more loss by virtue of the air gap between the fiber connectors. "Unplug" refers to the state in which the fiber connector is fully withdrawn from the mating sleeve, wherein the gripper is able to withdraw a connector 101 from its corresponding connector port 55 for movement to a different destination port 55.

In a preferred exemplification, the four magnets 13, 14, 15 are about 6 mm×6 mm×3 mm in size, and their material is Neodymium 42SH. This magnet grade provides high magnetic attraction force of at least 500 gram-force in "allocate" state, and also maintains magnetic properties even when exposed to high temperatures (above 150 degrees C.). The N-S magnetization axis is typically parallel to the 6 mm side. Ideally, the magnets are nickel-plated so they can be soldered to metalized pads of the printed circuit board connector row using a standard solder reflow process.

III. Parallel Rows of Fiber Optic Connectors that Independently Translate Laterally Under Software Control A portion of the automated cross-connect structure 200 in the present invention thus comprises a stacked arrangement of independently translatable connector rows which form a two-dimensional array of ports. A particular example with eight vertically stacked connector rows 102 with a vertical spacing of about 12.5 mm is depicted in FIGS. 3 and 4. In this particular example, each row 102 is comprised of twelve parallel connector tracks each spaced transversely by about 32 mm Each connector track is elongated and narrow and has selected flexure properties. The N-S polarity and arrangement of magnets 14, 15 at the distal end of each connector track are identical for each track and row. As a consequence, when the rows are in horizontal (x) alignment as shown in FIG. 4, the magnets 14, 15 on each row cause the distal ends of each connector track 39 to repel one another in the x and y directions. These repulsive forces are effectively positioned to partially magnetically levitate the narrow semi-flexible connector row assembly 102 and reduce the potential for interference of adjacent rows of extended connector tracks 39.

In the absence of magnetic levitation of fixed connector tracks 39 detailed in FIG. 2, deflection of the extended connector track could otherwise occur due to the tension vector of the fiber optic connector 101 engaged therein. The minimization of deflection is effective to eliminate potential jamming of vertically adjacent rows and the fiber connectors seated therein during the independent row shuffle process.

In further accordance with this invention, each connector row is supported at opposite ends by sets of three miniature rotary bearings mounted in bearing blocks 43, 44 that provide guidance in the two axes (x, z) parallel to the surface of the connector row, and support it above the lower row. Each bearing rides within its own track within an injection molded plastic block on the left and right ends respectively, as viewed in FIG. 4. A central support roller 38 further provides a mechanical reference point at the center of the row to preclude a potential slight bowing along its length of the mechanical row assembly 102. This reference surface provides adequate support to prevent large deflection of the connector row during gripper engagement when the gripper mechanically latches onto a particular connector track 39 (FIG. 2) of the connector row.

Preferably, the connector row 102 is comprised of a printed circuit board substrate made of common circuit board materials such as FR-4 with a thickness of 2.4 mm for high stiffness. This material is flat, stiff, inexpensive, and facilitates the reliable placement and soldering of magnets onto the circuit board. The ability to add circuitry also enables the implementation of RFID tracing of connectors as well as optical power monitoring and detection.

Each connector row 102 is independently shiftable by a motor 20-1, only some representative examples of which are seen in FIG. 4 and which are shown as a unit of four motors in FIG. 4. This motor 20-1 is typically a linear permanent magnet dc stepper motor that provides precise, programmable linear translation of the row over about 37 mm range of travel. The low friction of the bearing track blocks or assemblies 43 and 44 ensures that only a minimal force (<100 gram-force) and low current are required to actuate each row.

As seen in the perspective views of FIGS. 3 and 4 of the connector row subassemblies 102, the narrow elongated connector elements or tracks 39 in each row are positioned to define like vertical columns or stacks of connector elements or tracks 39. These elements are horizontally separated from each other by a standard distance which in this example is about 37 mm. For clarity only one fiber connector assembly 101 is depicted in the upper view of FIG. 4, and shown as coupled to an internal fiber 52 leading to an external buffer port (not shown) in the system. It will be understood from the referenced previously issued patents that interweaving through the three-dimensional mass of fibers 52 is affected by laterally shifting the rows of elongated fixed elements in timed relationship to the instant vertical position of the fiber transport. The fiber is thus repositioned by being interwoven through the existing pattern of fibers, without entanglement, until it reaches its destination, where it is engaged in the terminal thereat, as described in the earlier issued patents.

Those skilled in the art will appreciate the problems that can potentially be encountered when navigating a thin element such as an optical fiber through a dense population of other optical fibers. In this respect, the employment of static small magnetic elements on narrow elongated elements to provide strategic magnetic attraction and repulsion forces, offers material benefits in the form of the presently disclosed system, both as to changing positions of elements and in maintaining stable operating states.

Figure 5:
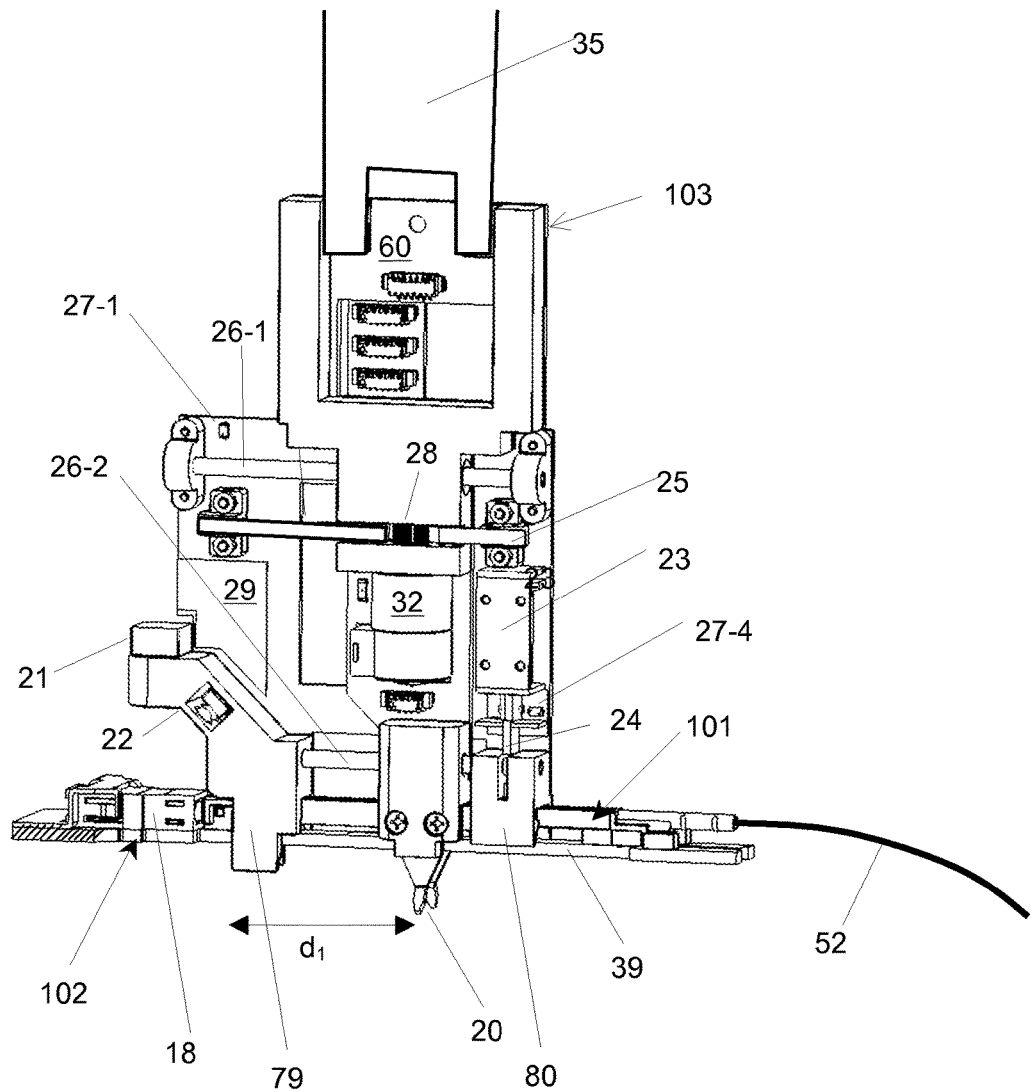
FIG. 5 is a side view of a gripper device in accordance with the invention, with fiber optic connector in the allocate configuration detailing the numerous positional sensing and actuation means.
Figure 6:
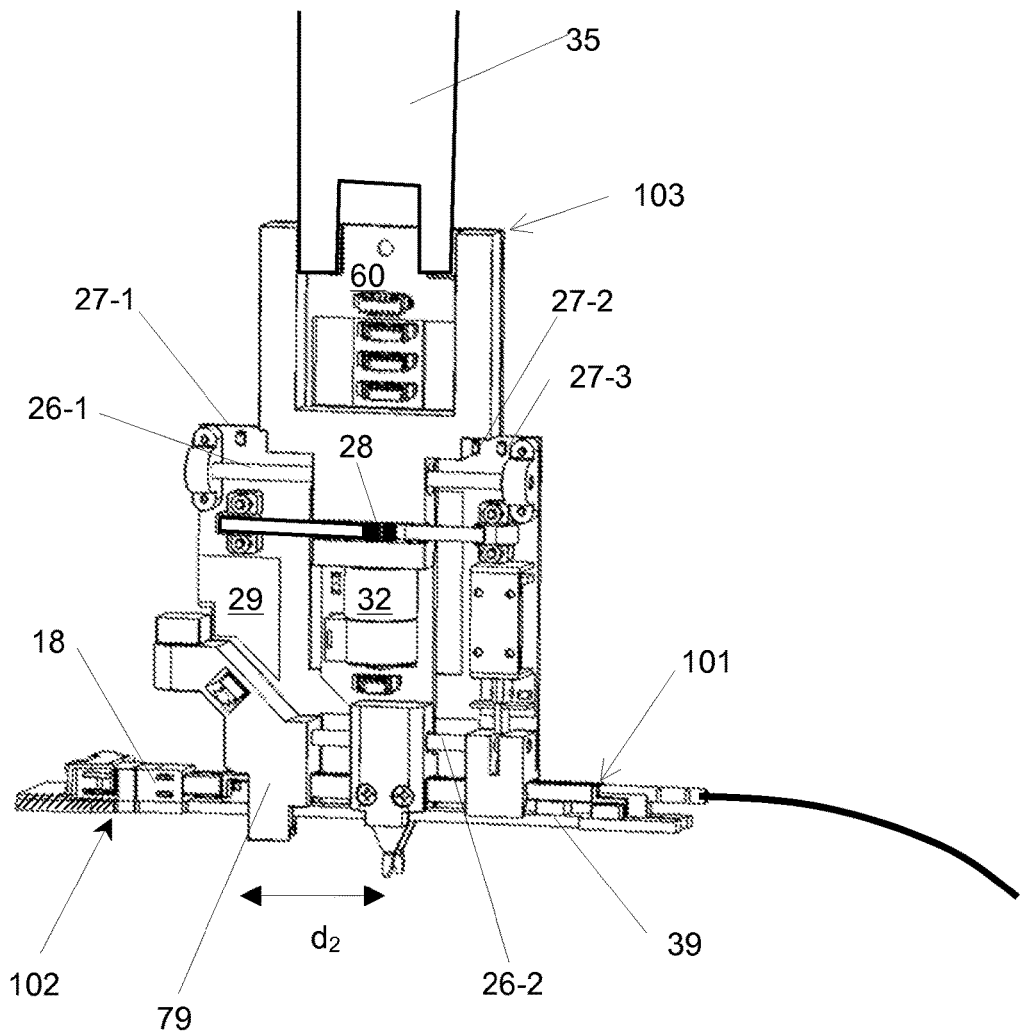
FIG. 6 is a side view of the gripper device in the unallocated configuration.
Figure 7:
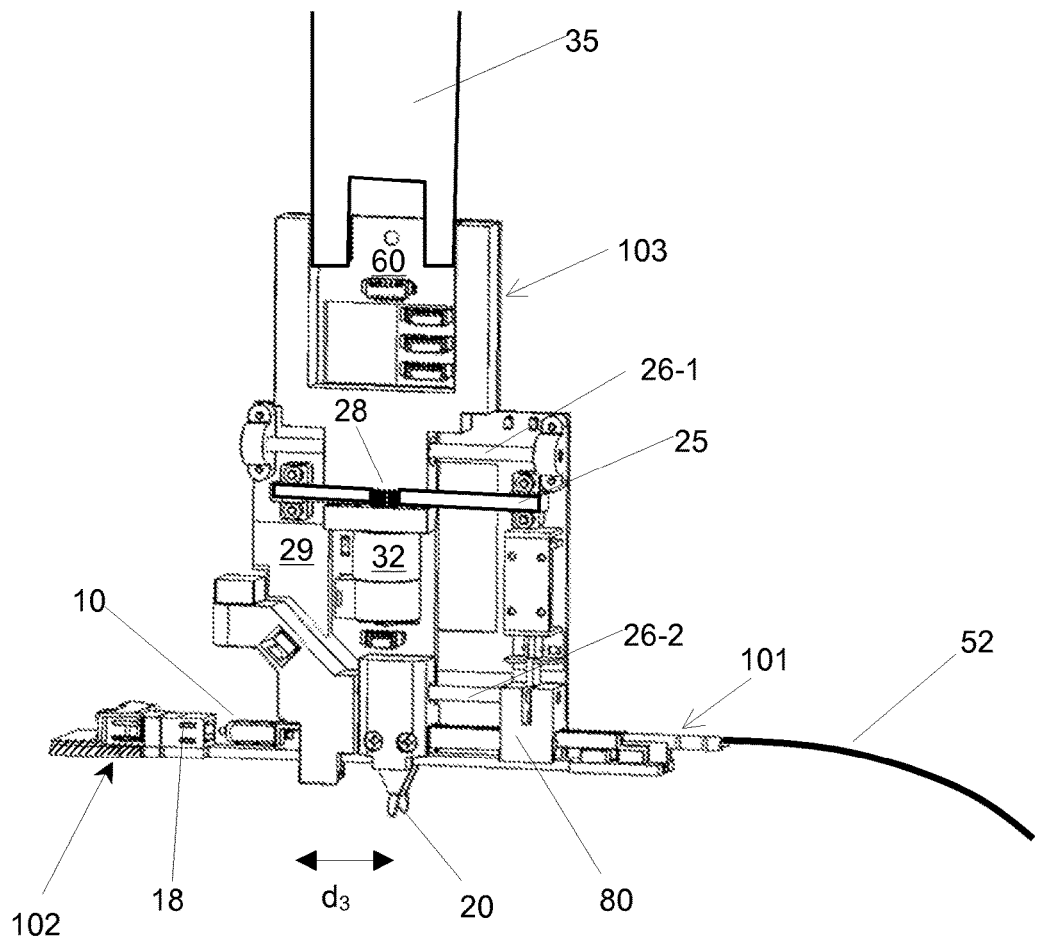
FIG. 7 is a side view of the gripper device in the unplug configuration.

IV. Narrow Form Face Gripper to Selectively Transport, Install and Reposition Fiber Optic Connectors in a Dense Matrix FIGS. 5, 6 and 7 illustrate an electronically actuable gripper device 103 changeably interlocked or docking with a typical connector row 102 to produce adequate local actuation force at the connector 101 to vary the engagement position of a fiber connector 101 in the two-dimensional array of output ports 81 as best seen together in context in FIGS. 1-4. The gripper is shown in three primary states of axial engagement corresponding respectively to the fiber connector 101 being "allocated" (FIG. 5) (or operatively engaged), "unallocated" (or partially inserted) (FIG. 6), or "unplugged" or fully disengaged (FIG. 7) from the connector and free to be moved elsewhere (or inserted). The gripper 103 descends onto the connector row and stops upon optically detecting engagement with a particular individual optical coupler 18 of the connector row 102 using a reflective optical photo-interrupter sensor 27-6. The light from the sensor is reflected from the edge of the connector track by a reflective plating/reflector surface 17 (FIG. 2), which is typically gold, and instructs the trajectory control system 117 (FIG. 18) that the gripper is properly docked onto the optical coupler 18. The interlocking is accomplished by mechanical engagement of the gripper guides 20 with the reduced-width docking section 16 (as best seen in FIG. 2) present on each optical coupler 18. The gripper subsystem comprises two closely adjacent printed circuit boards 60 and 29 lying in the narrow vertical plane which extends down to any selected row, the gripper subsystem also including multiple sensors and actuators. The upper circuit board 60 is attached to the lower end or inner stage 35 of the telescopic robot actuator (see FIG. 5). The adjacent lower sliding circuit board 29 is mounted on a linear bearing assembly, including parallel horizontal upper and lower shafts/rods 26-1 and 26-2 respectively, so that this portion of the gripper, which is not fixed to the closely adjacent printed circuit gripper board 60, can translate horizontally in either direction between closely spaced limits within the same narrow columnar region as the fiber connector 101. Sensors 27-1, 27-2, and 27-3 detect the translation of the overlapping but lower circuit board 29 in the allocate, unallocated and unplug locations, respectively, as the distance d decreases from $d_1$, $d_2$ to $d_3$, respectively. The lower sliding circuit board 29 includes mechanical elements 79, 80 spaced along its length that can retain (79) and lock (80) onto the length of the fiber connector 101. Optical sensors are typically reflective and/or transmissive photo-interrupters. A solenoid 23 responsive to control system 117 triggers a spring-loaded mechanical latch 24 within the locking element housing 80, wherein the state of the latch is detected by reflective photo-interrupter sensor(s) 27-4 and 27-5 integrated on electronic circuit board 29. In a particular example, translation of the gripper device 103 is powered by a motor 32 and timing belt drive consisting of a timing belt pulley 28 and timing belt 25, or a high efficiency drum/wire drive system.

In a further example, to identify fibers based on their barcode and to provide machine vision alignment, the gripper 103 may further include a camera 21 and LED illuminator 22 to capture images of the connector 101 and its unique barcode identifier. Alternatively, the reel encoder circuit 51 enables any fiber to be uniquely identified by monitoring the reel encoder sensor signal 72 as the fiber is transported by the gripper.

In a particular example, the gripper 103 provides about 19 mm of linear travel, sufficient to allocate (FIG. 5, $d_1$), unallocate (FIG. 6, $d_2$), or unplug (FIG. 7, $d_3$) the connector 101 as commanded where the incremental distances $d_1$, $d_2$ and $d_3$ are approximate as depicted. When unplugged, the connector 101 can be transported vertically without interference through the lateral volumetric space 118-$j$ extending from the top to bottom of any particular column j, between and independent of all other fibers in the matrix. When a connector assembly 101 is delivered to its destination connector track 39 on the connector row, its forward or ferrule tip 10 is adjacent but spaced apart from the chosen fixed connector in the assembly of connectors 102, as seen in FIG. 7. The gripper assembly 103 is thus held in the "unplugged" position, as seen in FIG. 7 prior to allocation. In this mode the lower planar circuit board 29 of the gripper assembly 103 is spaced apart from the connector 102. The gripper guide 20 remains fixed as the lateral position of fiber connector assembly 101 changes. Full engagement is seen in the view of FIG. 5, in which the lower printed circuit board 29 has been shifted to the left by the actuated gripper assembly 103 in response to energizing the motor 32 of gripper actuator. This is the "allocate" position, in contrast to FIG. 6, which shows the "unallocate" or partially engaged position, and FIG. 7, in which there is no connector engagement.

V. Telescopic Robotic Vertical Actuator

The gripper device 103 is mounted on the lower end of, and is transported by, a two-axis robot mechanism 104 as illustrated in FIGS. 1A, 8A, 9, 10A, 10B and 10C. The robot device 104 is telescopic in the vertical direction to enable the gripper device 103 to reach a large number of cross-connects within a height constrained installation. It comprises a rectangular outer arm or outer stage 30 and an inner arm or inner stage 35, and is movable in the horizontal direction by a drive belt 25 or wire/string extending between fixed end points. The vertical telescoping and horizontal movement capability ensure that the arm can reach all connectors within the two-dimensional array of rows of connector ports 55 (FIG. 2) without adding excessive height to the overall robotic cross-connect system above the 2.15 meter height standard preferred by the industry.

Telescopic robot arms in the prior art do not have the required stiffness nor the aspect ratio/miniaturization needed to descend and operate in between the internal fiber connectors with requisite positioning accuracy (~+/−3 mm) of the internal connector with tensioned fiber attached. In the present system, however, a vertical linear outer stage 30 of a slender hollow rectangular or partial rectangular cross section receives a sliding interior member or inner stage 35 of smaller cross section. As seen in FIG. 10B the top end of the arm or inner stage 35 of the robot arm includes an internal carriage that spring-loads roller bearings 92, 93, which contact the inner side walls of the rectangular or "C" shaped hollow cross section outer arm or outer stage 30. In the preferred embodiment the outer stage 30 and inner stage 35 are stainless steel or plain steel; however, aluminum, plastic, fiberglass and carbon fiber are all suitable alternatives.

Figure 8A:
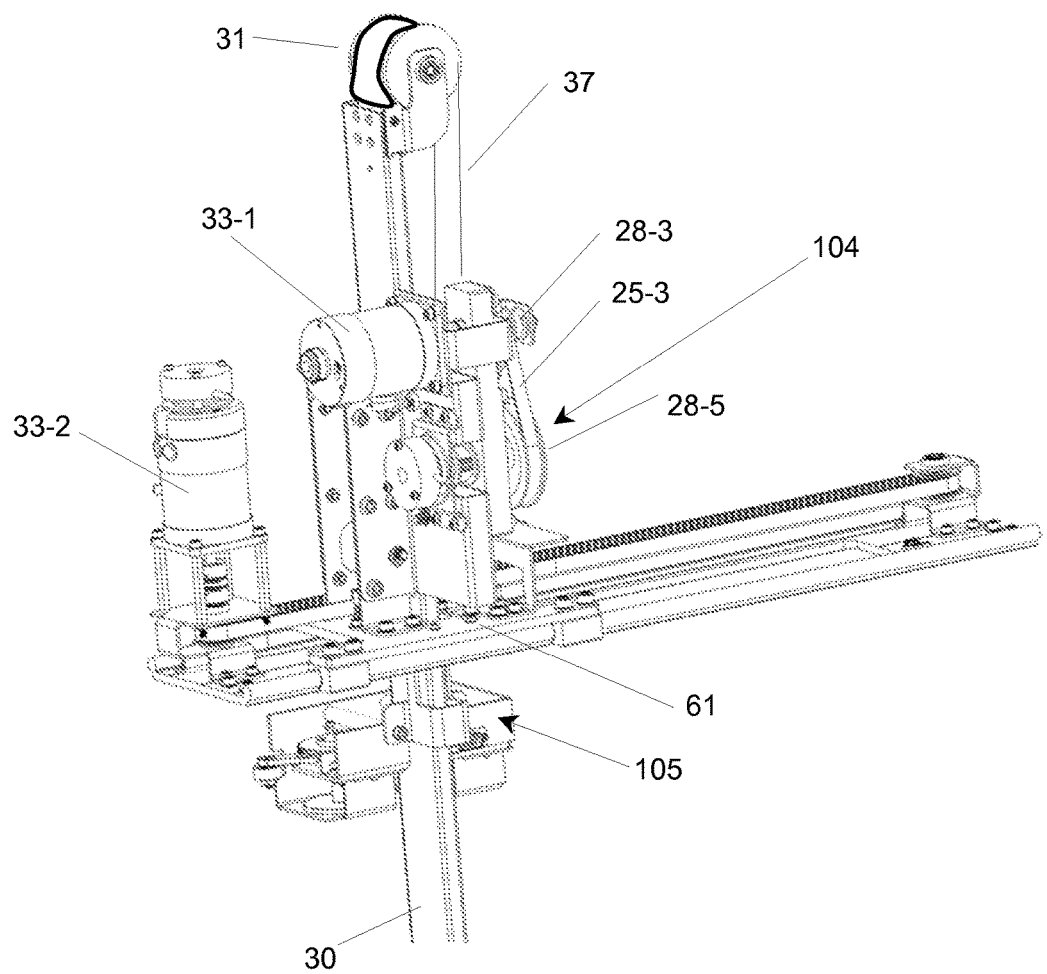
FIG. 8A is a partial, perspective view of a two-axis robotic actuation system in accordance with the invention, which moves a gripper mechanism within the internal fiber cross-connect volume.
Figure 8D:
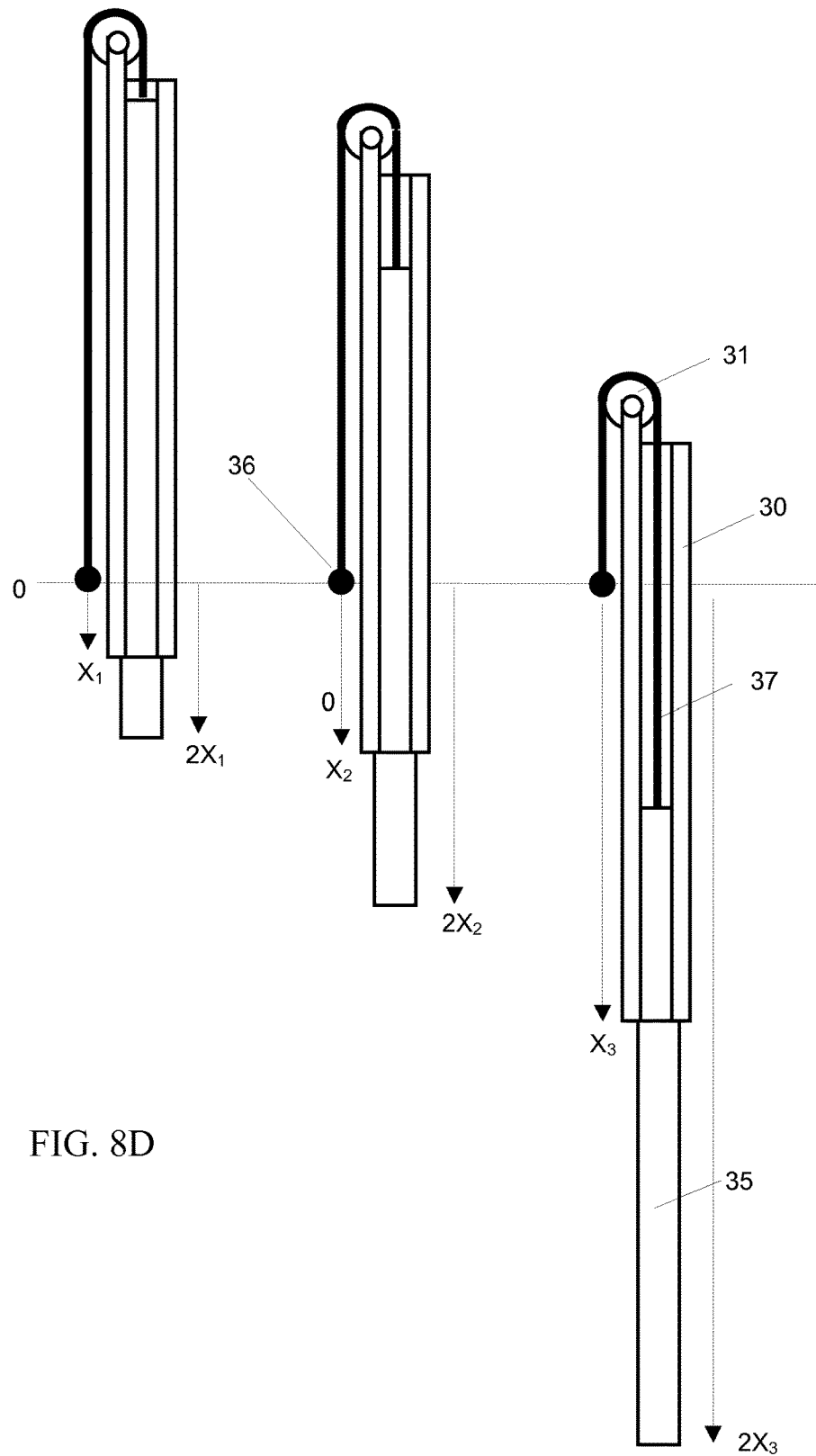
FIG. 8D is a schematic view of the y axis drive in various extended states.
Figure 9:
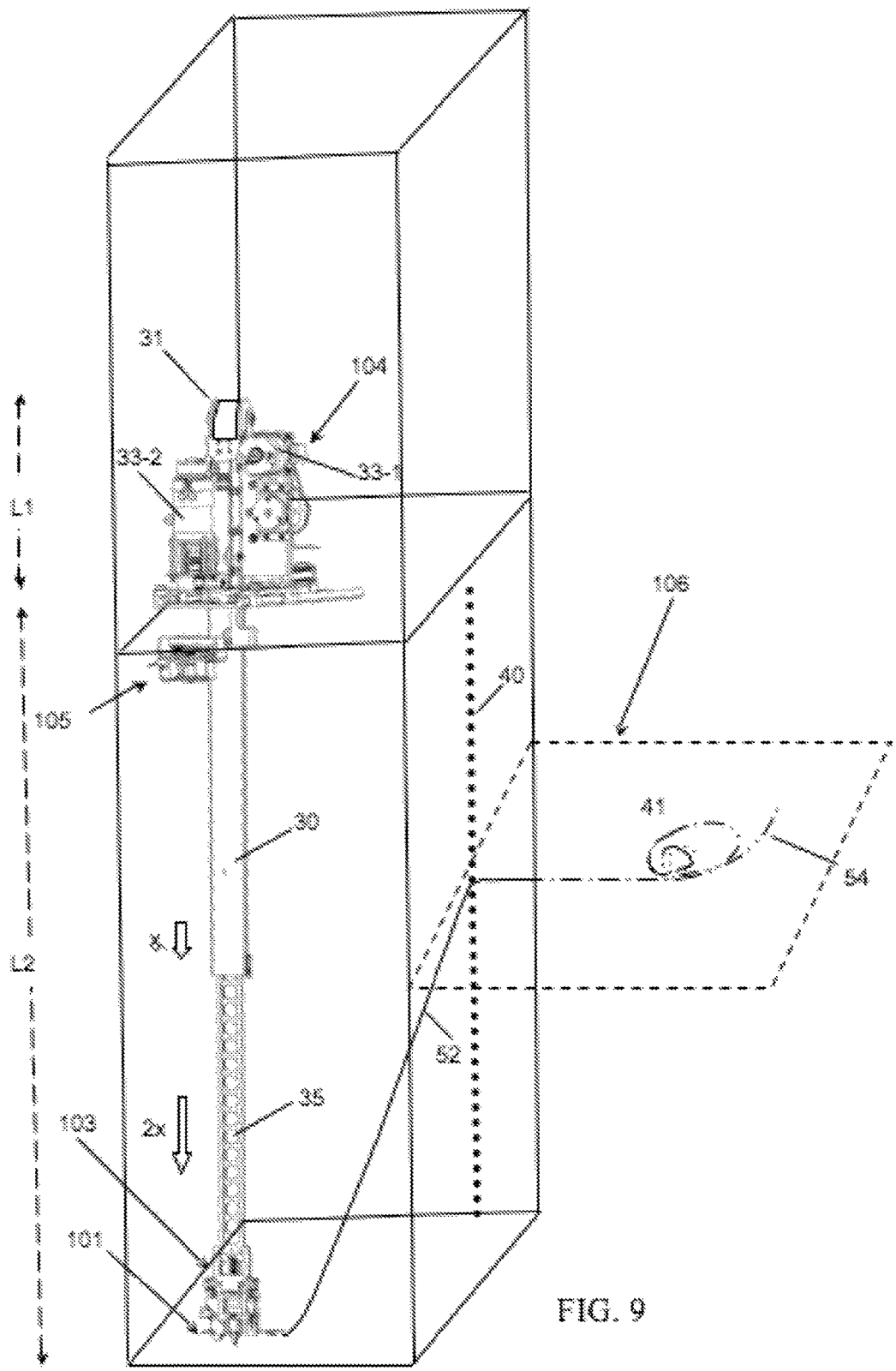
FIG. 9 is a further perspective and diagrammatic view of actuation system of FIGS. 8A-8C, depicting the gripper at the end of a two-stage telescopic arm in the fully extended state.
Figure 10A:
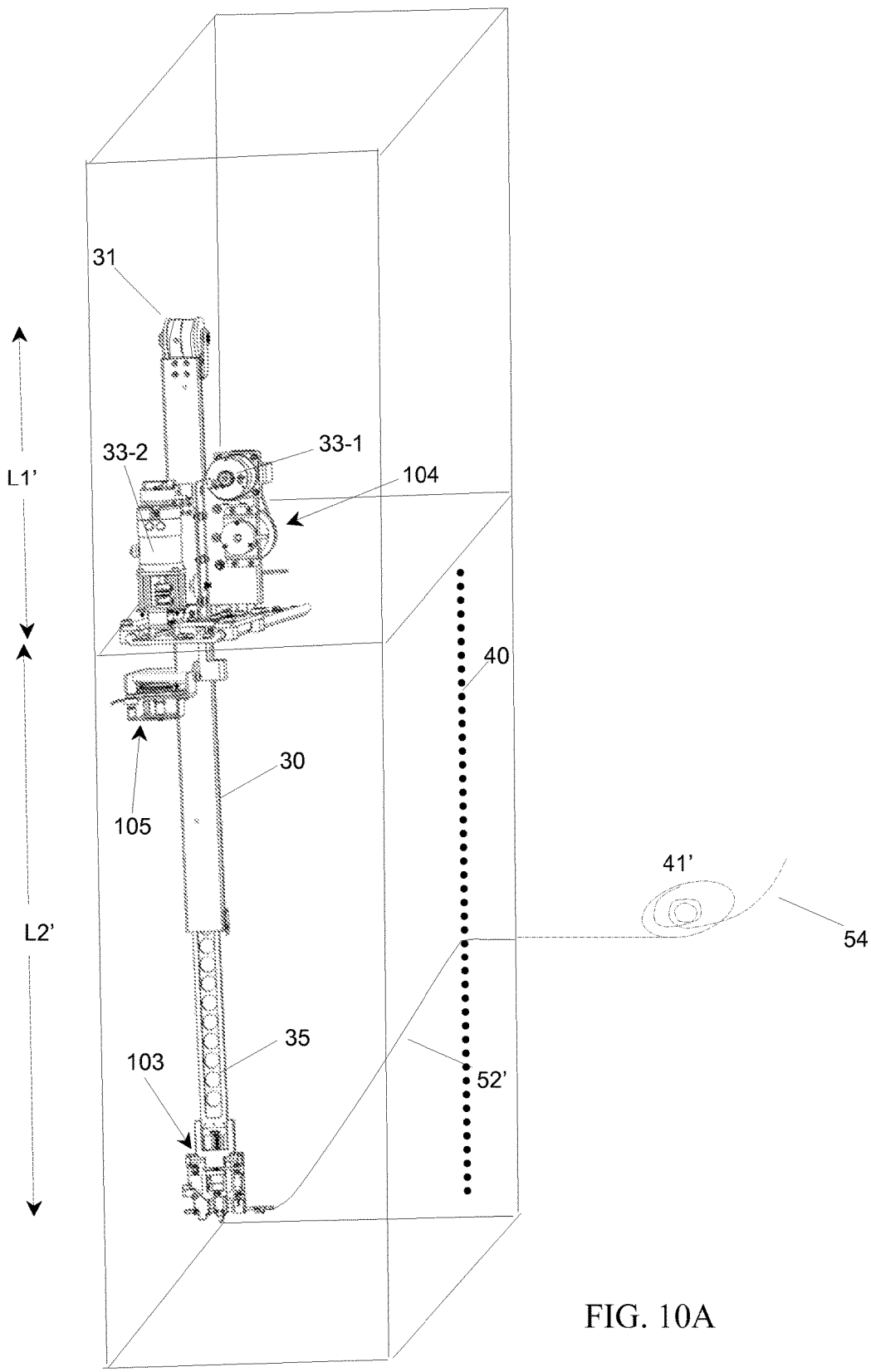
FIG. 10A is a partial view of the two-stage telescopic arm in the partially extended state.
Figure 10B:
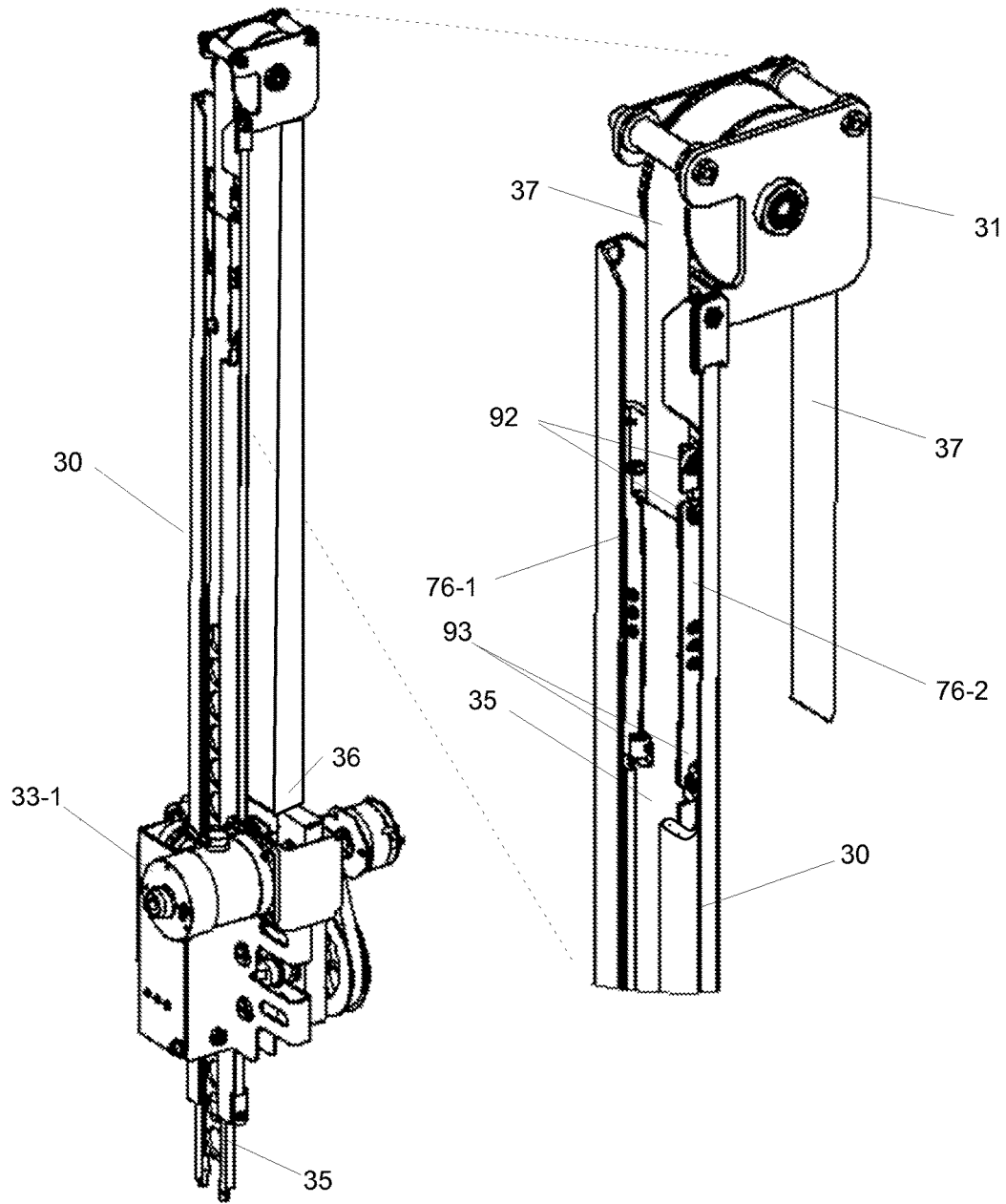
FIG. 10B is a partial breakaway view of the vertical portion of a telescopic arm in the substantially retracted range of travel.
Figure 10C:
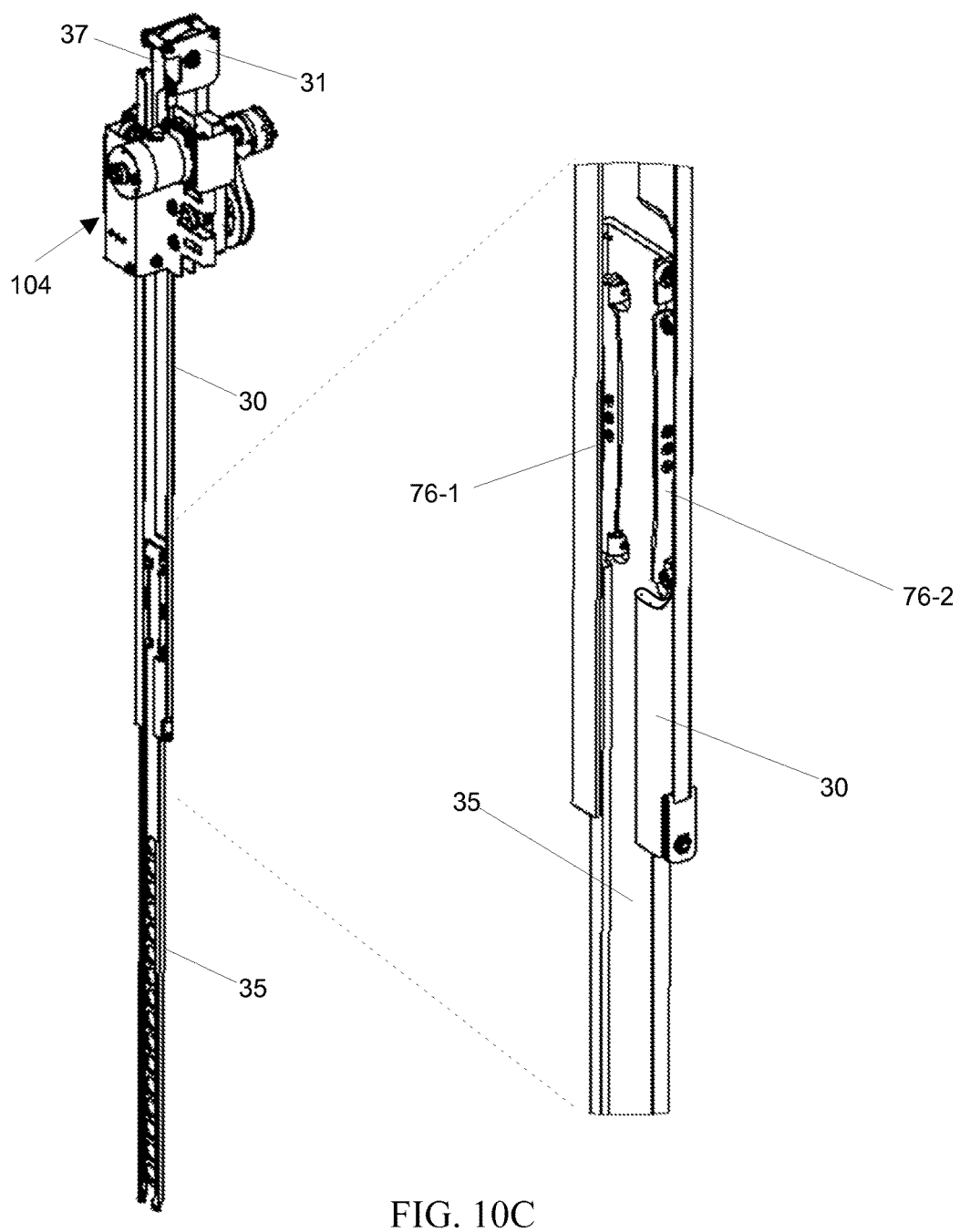
FIG. 10C is a perspective view, also partially broken away, of different segments of the telescopic arm in the substantially extended range of travel.

The gripper mechanism 103 is attached to the lower end of the inner stage 35 of the robotic arm system, which telescopes within the tubular outer stage 30 and variably extends in length, as seen in FIGS. 9 and 10A. The electrical cable 37 carrying electrical signals for the sensors and actuators embedded within the gripper 103 travels up the inner stage 35, then through the outer stage 30, exits the top of the outer stage 30, wraps around an upper pulley 31 and then extends down to a fixed attachment at point 36. As seen in FIGS. 8A and 9, a Y axis motor 33-1, for example a dc servomotor or stepper motor, drives the tubular outer stage 30 up and down through a timing belt drive mechanism attached to the top and bottom of the outer stage 30. The multi-conductor electrical ribbon cable 37 is rigidly affixed to the top of the inner stage 35 and its midpoint is fixed at a cable attachment point 36. As the outer stage 30 moves up and down (FIG. 8D), the inner stage 35 moves at twice the outer stage distance because of the action of the cable 37 looping over the pulley which is attached to and moves with the outer stage.

The telescopic arm exhibits relatively low transverse compliance or equivalently high rigidity. In a particular example, less than 2 mm of deflection results for about 50 gm of transverse force applied perpendicular to the telescopic direction (i.e. in x and z directions defined in FIG. 1)

and high length efficiency (ratio of the telescopic arm range $L_2=1.5$ meters to arm retracted height $L_1=1$ m, FIGS. 9, 10A, 10B). This rigidity is important to prevent the tension from the fiber 52 attached to connector 101 from dragging or deflecting the telescopic arm out of true vertical alignment. In contrast to prior art telescopic arms (e.g. drawer slides, telescopic booms, etc.), the transverse compliance is independent of extended length $L_2'$ (0 to 1.5 meters) of the telescopic structure. This is a significant advantage of the present invention, because reliable engagement of any connector 101 across the extended front connector array, by gripper 103, also requires some non-zero level of deflection and consistent deflection and compliance characteristics to enable automatic, passive alignment via the mechanical capture method. On the other hand, low vibration at all locations of the connector array at the end of the telescopic arm should also be maintained.

In accordance with the invention, tightly controlled compliance characteristics are achieved by (1) providing a roller bearing system for the outer, first stage that is very stiff and (2) providing a roller bearing carriage for the inner, second stage, wherein a set of bearings are located at the upper 150 mm of the inner, second stage, suitably preloaded by mounting the inner carriage on spring loaded roller bearing flexures 76-1, 76-2 so that the carriage is guided within the tube (outer stage) 30 with high angular consistency. The bearing system is illustrated in part in FIGS. 10B and 10C and is comprised of internal x axis support bearings 92, and internal z axis support bearings 93. To preload the system there are further preloaded internal x support bearings 92' at opposite, suspended ends of flexure 64 and preloaded internal z support bearings 93' at opposite, suspended ends of flexure 76.

The bearing flexures 76-1, 76-2 are, for example, semi-hard stainless-steel sheet metal structures deflecting under load like a leaf spring, with radial ball bearings 93 attached at both ends of the flexure arm. Mechanical stress arising from deflection is by design smaller than the yield stress of the material, thereby preventing the flexure from permanently deforming. These flexure arms 76-1, 76-2 are affixed to the rigid, steel inner second stage at the top of the inner stage 35 so that the opposite bearings are preloaded and in contact with the outer tube as they ride up and down the inner cavity of this outer first stage 30. The friction of the bearing assembly is sufficiently low that the inner stage descends controllably within the outer tube due to gravity alone and is supported by the electrical ribbon cable 37. This cable serves two purposes: it resists gravity preventing the arm from dropping and transmits signals from the gripper 103 to the trajectory control system 117. This cable 37 is routed around the pulley 31 attached to the top of the outer stage 30 and affixed to the main robot x axis carriage 61.

Figure 8B:
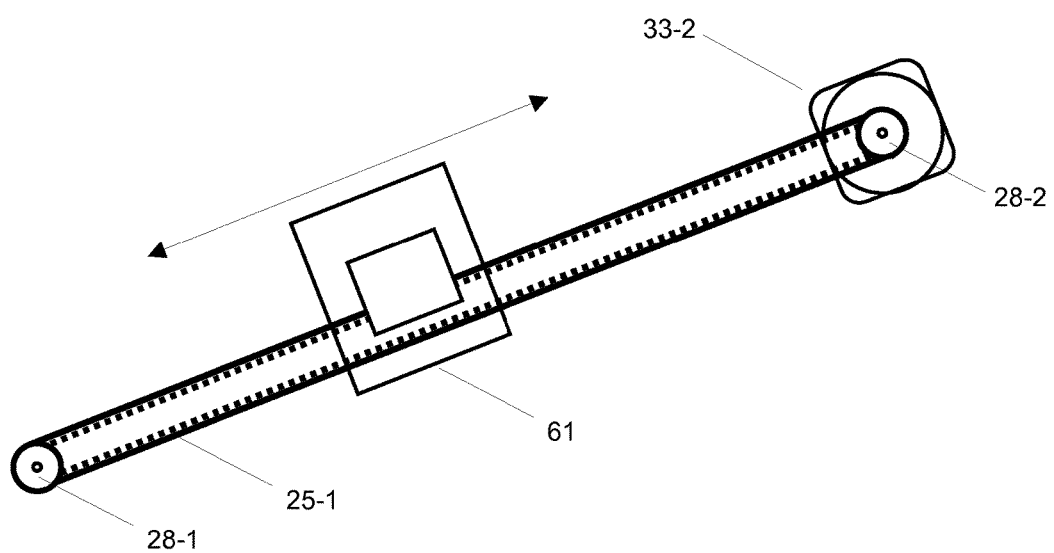
FIG. 8B is a schematic view of an x axis drive mechanism.

FIG. 8B is a schematic top-view of the horizontal or x-axis carriage drive system, consisting of a timing belt 25-1 with drive pulley 28-2 coupled to the X axis servomotor 33-2 with gearbox at one end, and an idler pulley 28-1 at the opposite end. The x-axis carriage of platform 61 is attached to timing belt 25-1, which translates the platform from one end of the x rail to the other end.

Figure 8C:
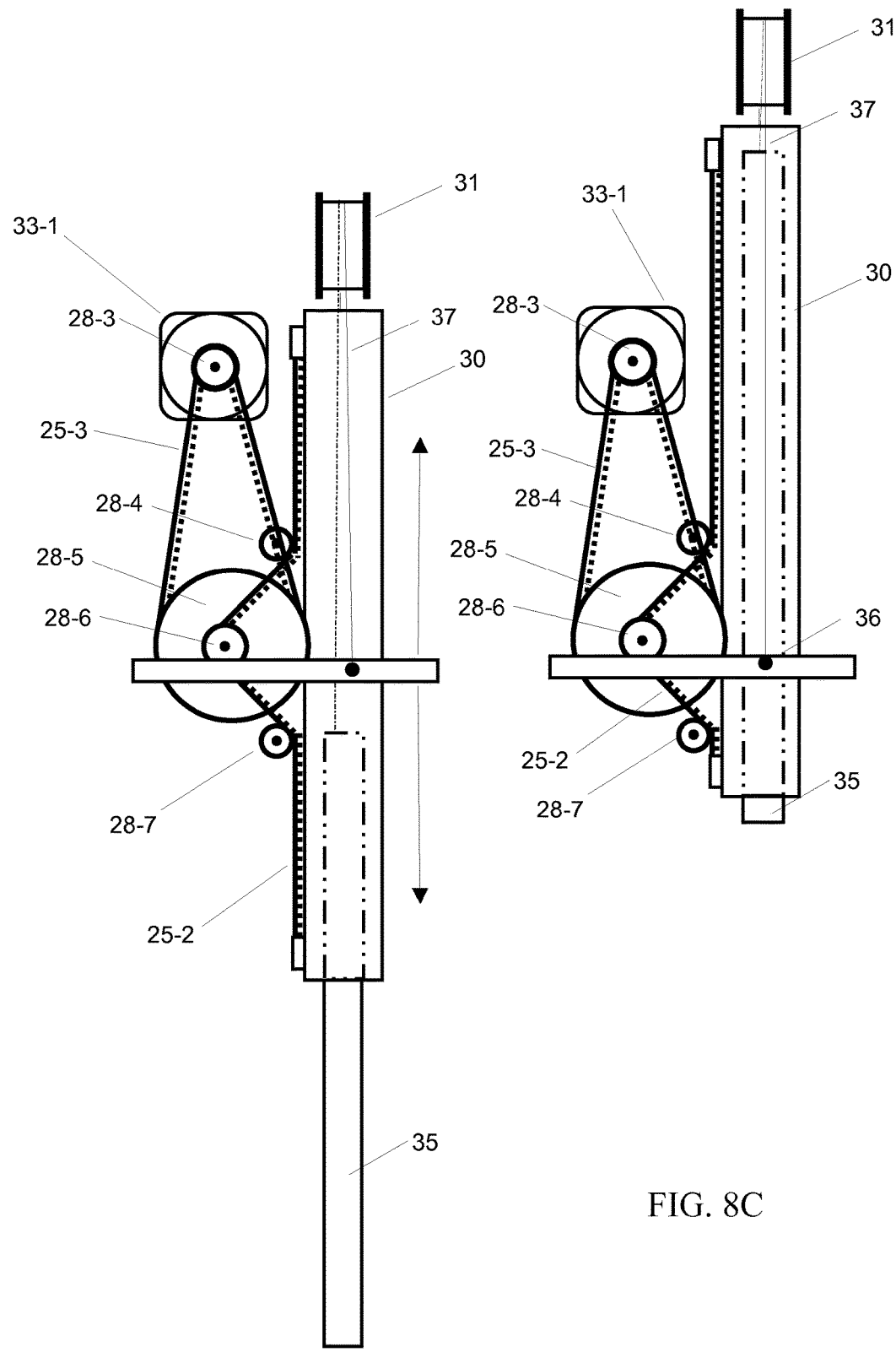
FIG. 8C is a schematic view of a y axis drive mechanism.

FIG. 8C is a schematic side-view of the y-axis actuation system, detailing the timing belt pulley drive system. A first timing belt 25-2 is affixed at opposite ends to the outer y axis tube or outer stage 30 and is used to drive the tube robot arm/outer stage 30 up and down. Timing belt 25-2 is redirected and wrapped around timing belt drive pulley 28-6 by a pair of idler rollers 28-7 and 28-4. Drive pulley 28-6 and reduction pulley 28-5 are rigidly attached to a common central shaft. The drive motor 33-1 turns a small drive pulley 28-3. A timing belt 25-3 wraps tightly around both the small diameter pulley 28-3 and a spaced apart large diameter pulley 28-5. The ratio of large to small pulley diameters is typically 5 to 10 to produce a torque multiplier.

As depicted in FIG. 8D, driving the outer arm or outer stage 30 with the timing belt raises or lowers the pulley 31 by a corresponding distance X, since the pulley 31 is mounted to arm or outer stage 30. The pulley 31 is free to spin. A fixed length elongated band, cord, wire, or cable 37 is attached at one end to a fixed point 36 of the y-drive platform, and the opposite end is attached to topmost portion of inner stage 35. This configuration results in the robot arm inner stage 35 moving at 2X, twice the distance of the robot arm upper or outer stage 30. FIG. 8D illustrates the configuration of the arm at various degrees of telescopic extension. The wire or cable 37 is wrapped around moving pulley 31. For a particular distance $X_1$ the outer stage arm 30 moves, the pulley also moves in the same direction the same distance $X_1$. Since the cable is a fixed length and suspends the inner stage 35, as the pulley moves a distance $X_1$ the translating end of the cable moves by a distance $2X_1$. As a result, the inner stage 35 moves a distance $2X_1$.

Figure 8E:
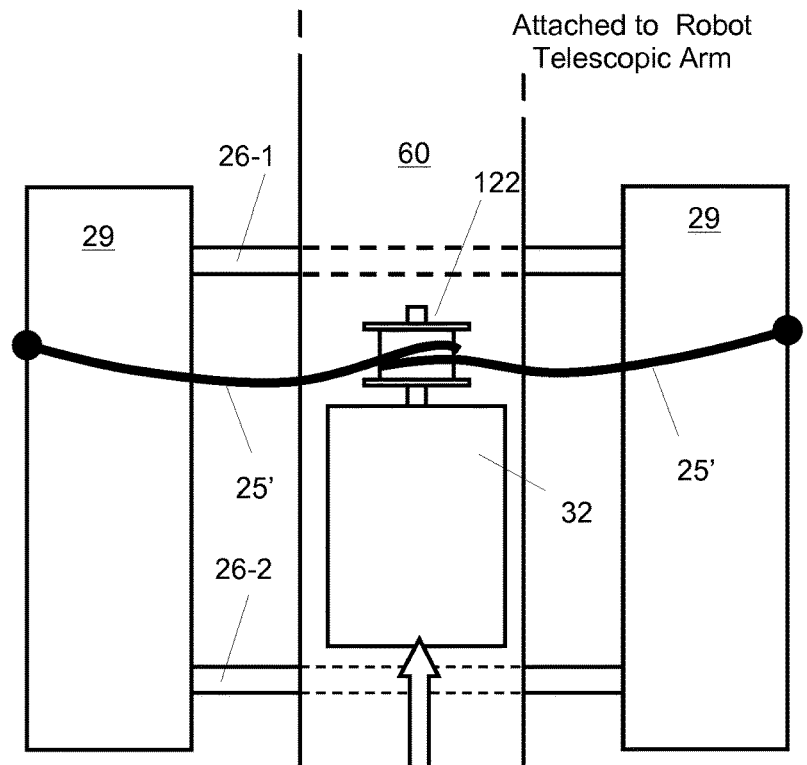
FIG. 8E illustrates the gripper z axis drive mechanism in central position, FIG. 8F in left position, FIG. 8G in right position.
Figure 8F:
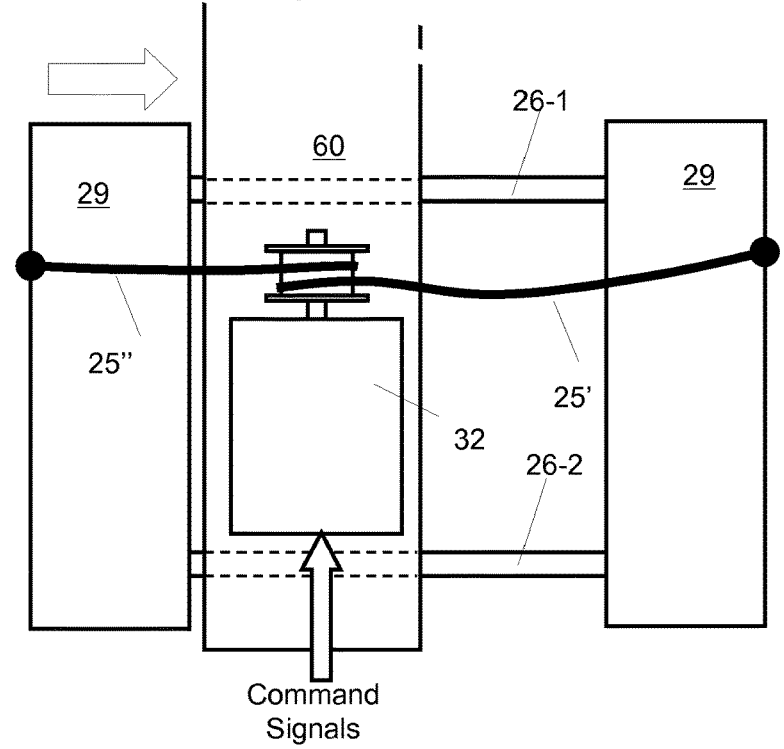
FIG. 8H illustrates the velocity trajectory of the gripper stepper motor actuating the z axis drive.
Figure 8G:
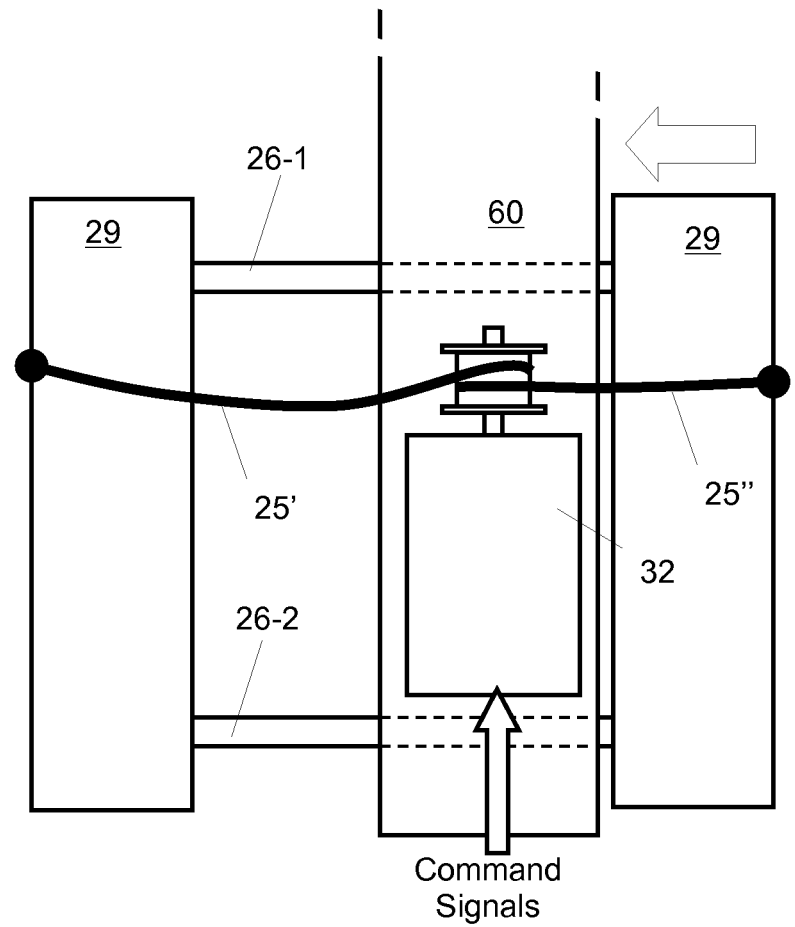

A particular exemplification of the gripper shown in FIGS. 8E, 8F and 8G, to which reference is now made, details a drive mechanism for reliably incrementing a selected optical fiber mounted on the fixed printed circuit board 60. The gripper includes a gripper activator in the form of a stepper motor 32 which rotates a gripper drive drum 122 on which a cable/wire or timing belt 25' is wrapped with a controlled looseness or "play." The winding of wire 25' on drum 122 pulls the outer printed circuit board structure 29, riding on parallel rods 26-1, 26-2 to the right (as shown by the arrow in FIG. 8F) by tightening the portion of wire 25", seen here on the left side of FIG. 8F, or left (FIG. 8G) by tightening the portion of wire 25" as seen on the right side of FIG. 8G. The provision of a chosen degree of slack within the wire provides a significant improvement in the amount of torque and corresponding linear actuation force available from a given stepper motor. Under typical operating conditions, the motor 33 must drive the gripper from an initial position of maximum resistance, thereby requiring the maximum torque at the start of motion. If the wire has no slack, the motor would need to overcome a large initial force as it accelerates. This is the force to plug-in or un-plug an internal LC connector 101. It is known in the art that stepper motors stall under conditions of high torque during an initial start-up acceleration. By providing a length of slack wire 25' on each side of the drum 122, the motor initially experiences only minimal load as it takes up slack by winding excess wire on drum 122. As a result, the motor is not subjected to the large load until after (1) it reaches a minimum velocity/is no longer in acceleration phase and (2) the wire no longer exhibits slack in taut section of wire 25" on one side or the other (e.g. FIGS. 8F, 8G).

Figure 8H:
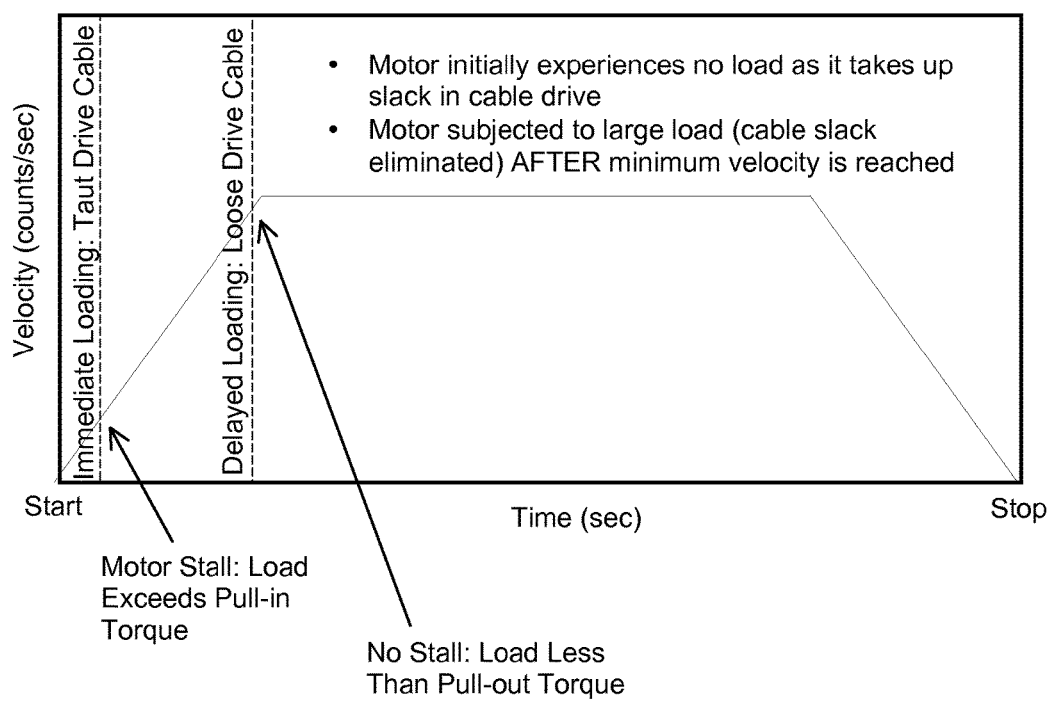

The stepper motor pull-in torque is the measure of the torque at which the stepper motor will stall when it is starting from rest. The pull-in curve defines an area called the start/stop region. When operating with proper selection of parameters such as velocity, acceleration and load torque, the motor can be started instantaneously with a load applied and without loss of synchronism. The slack wire in the cable drive ensures that this load torque is initially low (FIG. 8H). In contrast, stepper motor pull-out torque is the torque that can be produced at a given velocity until the motor stalls. The pull-out torque is typically at least a factor of 2 higher than the pull-in torque. It is therefore advantageous for the gripper stepper motor to operate in the pull-out torque regime when experiencing the largest loads associated with plugging-in/unplugging internal optical connectors 101, to ensure the maximum torque output for a given z drive system.

VI. Slack-Fiber Take-Up Reels and Rotation Sensing

The fiber connectors in the connector assembly 101 terminate as output fibers 52 (FIG. 11A) from low profile spring-loaded reels 41 (FIG. 11B) that are arrayed on a planar, low profile tray 47, as shown in FIGS. 11A to 13A. This example of a fiber tray assembly 106 (FIGS. 11A and 11B) includes twelve fibers that are rendered individually and independently self-tensioning, by reels 41 to which the fibers 52 are guided after passing through a center backbone 40 of linearly arrayed flexible guides. Flexible guides are typically a low friction tubing material such as PTFE, FPA, FEP, etc. In the particular example shown here, the opposite ends of each of the twelve fibers exiting the backbone have originated in connectors that are plugged individually into different ones of a linear array of mating sleeves or optical couplers 18. The internal paths of the fibers 52 between the interior reels 41 and the output connector array 42 are depicted in FIG. 11B.

Figure 11B:
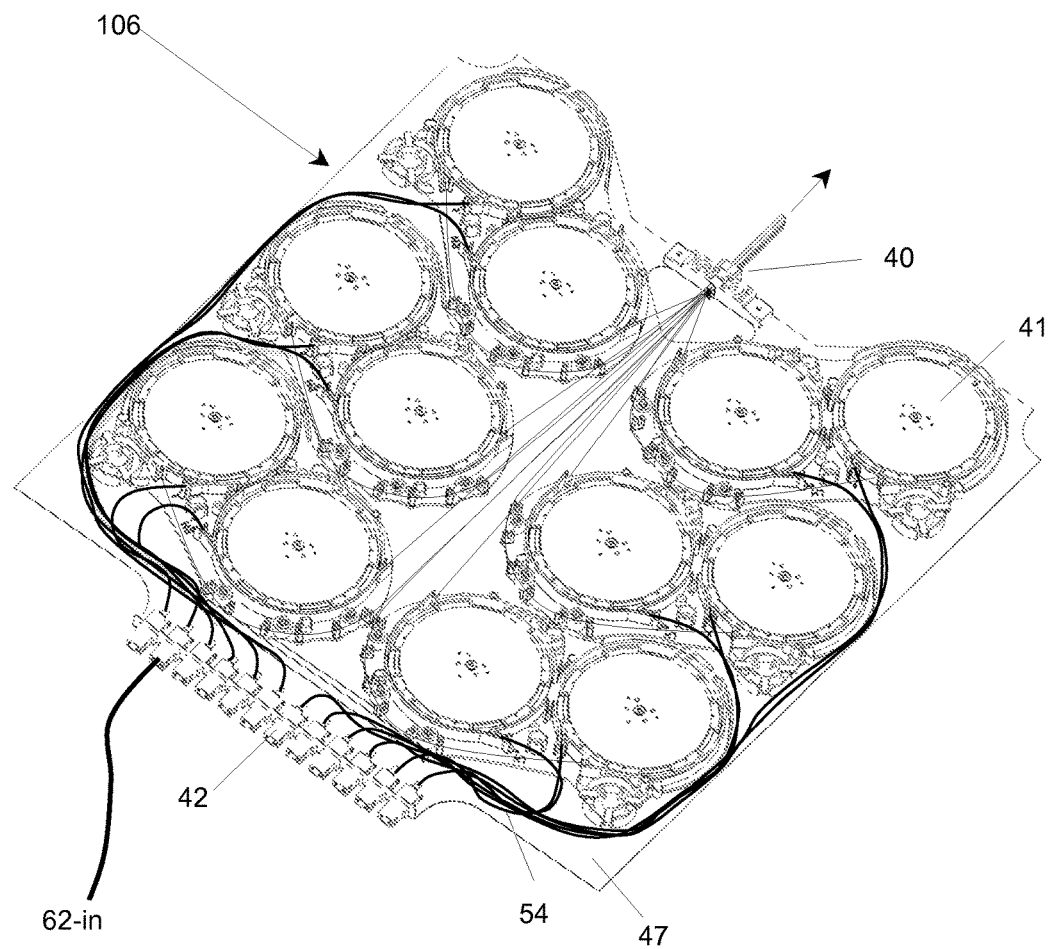
Figure 12:
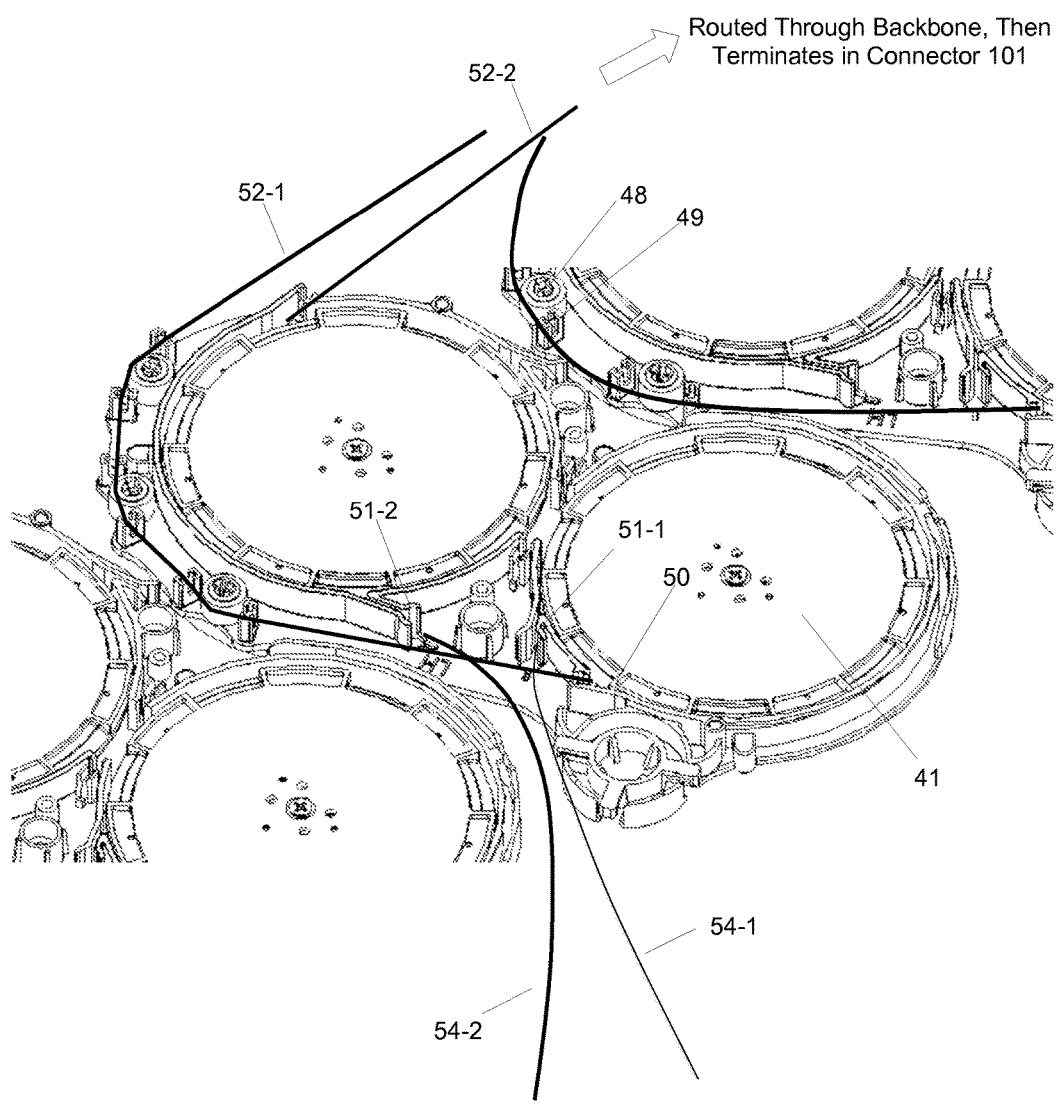
FIG. 12 is a perspective view of a portion of the stacked arrangement of multiple fiber take-up trays, detailing the routing of optical fibers from individual reels to the central backbone through low friction O-ring shaped eyelets and soft rubber-clad rollers.
Figure 13A:
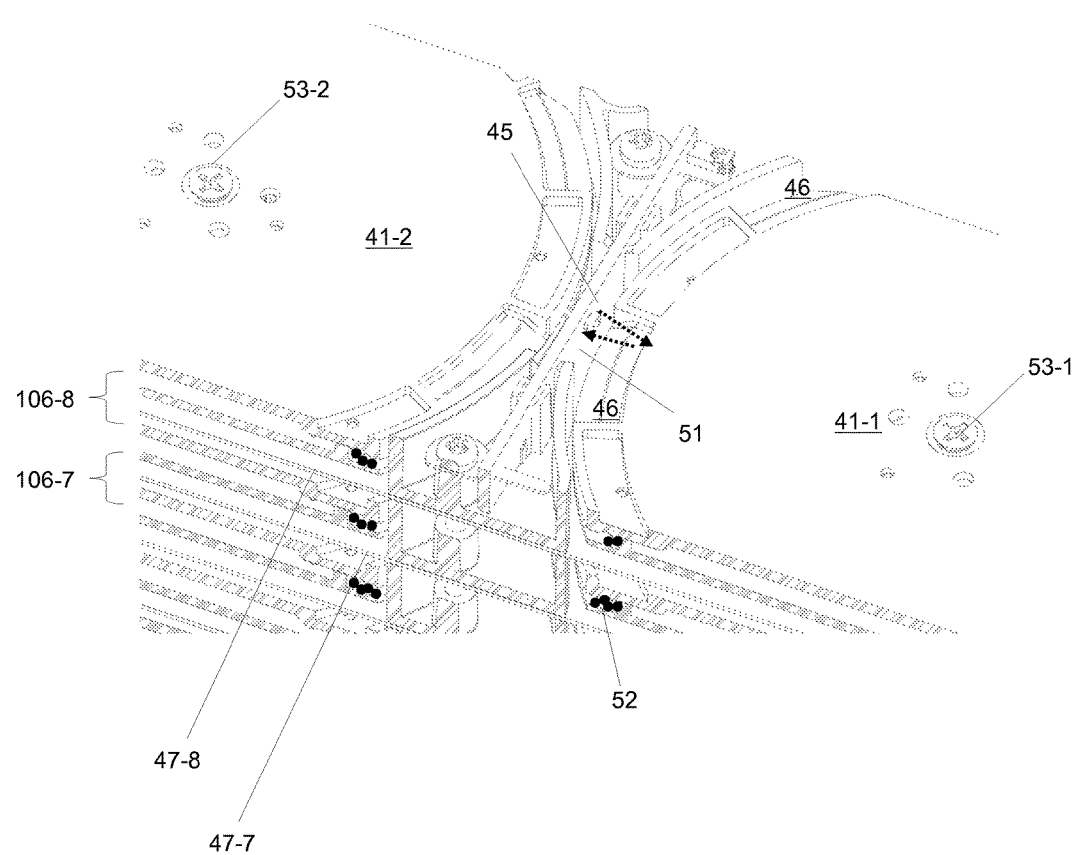
FIG. 13A is a partial cutaway perspective view of a portion of the optical fiber reel system including sensing electronics to detect the rotation of the reel during dynamic reconfiguration such that proper fiber slack management can be validated.

The fragmentary perspective view of FIG. 12 details the paths of the fibers to individual reels including front, dynamically moving fibers 52 exiting from the reel fiber exit location 50 and terminated in connectors to form the dynamic output connector array 81 (FIG. 1A), and rear, fixed-length fibers 54 (FIG. 11B), also exiting from reel fiber exit location 50 and ultimately terminated in connectors to form the static input connector array 82. As seen in FIG. 12, the fibers are routed through O-ring eyelets 49 and around fiber rollers 48 to redirect the dynamically moving fibers with low friction and low stress as they experience an angular change of about 90 degrees while passing around an intervening reel 41. As the fibers 52 are withdrawn or retracted back into a reel, the reel 41 rotates, causing the reel's internal fiber to spiral on its underside (as disclosed in U.S. Pat. No. 8,068,715) so as to coil or uncoil, respectively. As seen in FIG. 13A, the outer wall of the reel is segmented and/or colored with alternating reflective/non-reflective circumferential segments 46 such that a reflective photo-interrupter 45, in combination with an electronic multiplexing and counter circuit 51 detects the number of turns the reel undergoes. This provides validation during operation that the proper length of output fiber 52 is present on the reel as a function of the movement of fiber connector assembly 101 during robot control.

Figure 11A:
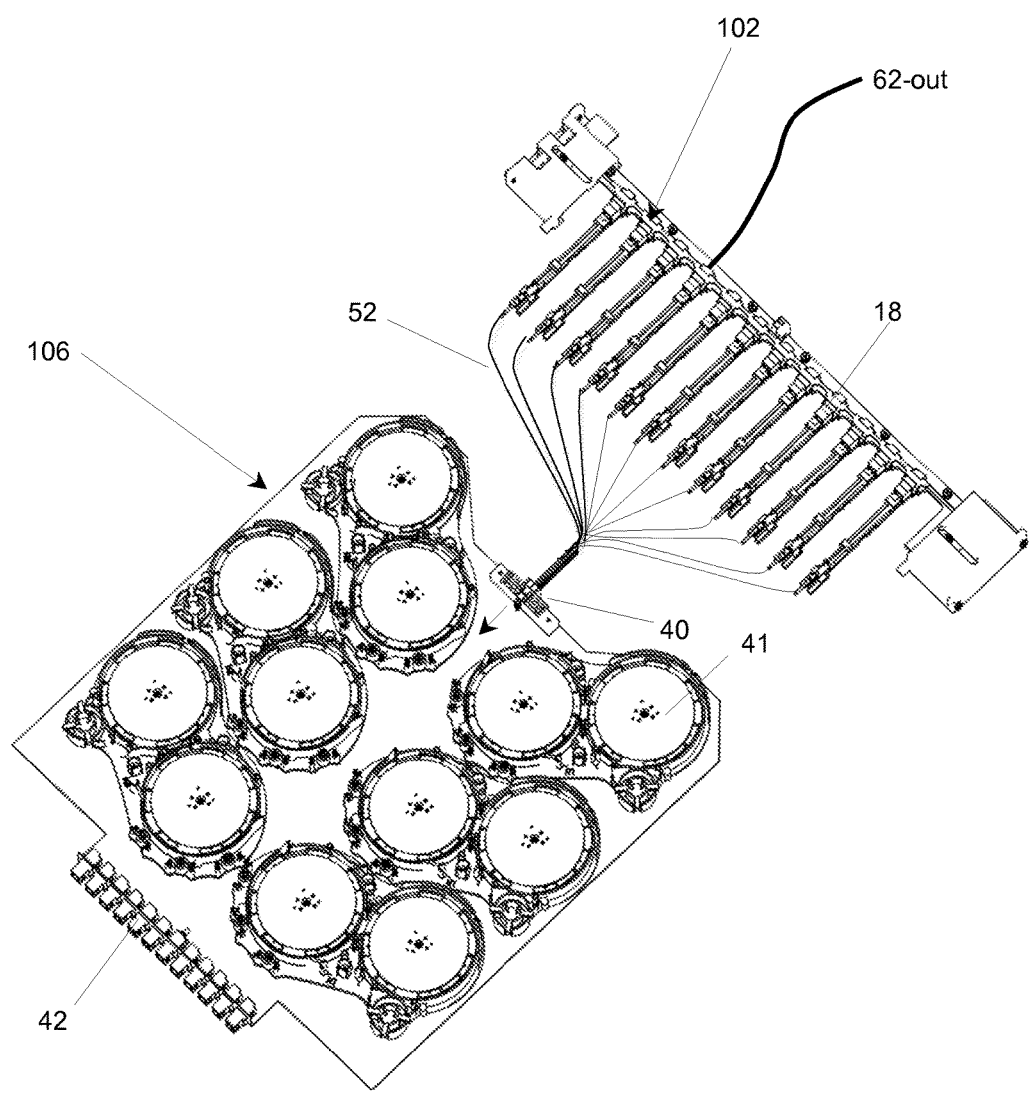
FIGS. 11A and 11B are top perspective views of an improved fiber take-up tray for fiber tensioning and dynamic slack fiber management, each including twelve individual reels and fiber guides facilitating low loss, dynamic optical fiber routing therebetween to the central backbone, depicting the portion of fibers in front of the backbone in FIG. 11A and the portion of the fibers in back of the backbone in FIG. 11B.

Different novel aspects of an improved multi-reel module are also depicted in FIGS. 11 to 13. FIGS. 11A and 11B, for example, illustrate an advantageous geometric layout of twelve take-up reels 41 for providing individually adjustable lengths of optical fiber. Here, each fiber tray assembly 106 distributes individual optical fibers from the backbone 40 to reels 41 which are linearly aligned in spaced apart sets of four extending from front to back on the reel tray 47. Furthermore, these reel sets are each adjacently positioned so that the pairs of adjacent reels each define an acute angle relative to the front to back axis on the tray 47. There are thus six reels on one side of the tray 47, and six reels on the opposite side positioned in oppositely angled pairs with an open central area of the tray 47 providing a pathway to input fibers from the backbone 40 input.

The fiber 52 inputs to the different reels 41 feed into the central area and are directed clockwise about the individual reels in the left (as seen in FIG. 11B) side set of six reels, and counterclockwise about each of the six reels on the right-side set. Since the reels of each pair are closely adjacent but spaced apart, the paths of fibers incoming from the central backbone 40 are different, dependent on whether a reel is the innermost one of the angled pair, or the outermost one of the pair. The problem is resolved, while still maintaining compactness and control, by the fiber guide geometry shown in FIG. 12, to which reference is now made. The inner (closest to the center) reel 41 of an angled pair receives a variable length of fiber 52 to take up or supply fiber as needed during reconfiguration. The variable length reconfigurable, auto-tensioned fiber 52 is controllably guided with curvature of greater than a minimum acceptable bend radius (typically >5 mm) The reels of each pair are closely adjacent but operatively distinct, which result is made possible by the angled and spaced geometry of the reels 41 of any module. At the opposite end of the fiber, a fixed rear length of fiber 54 is fed to the individually coupled lines in the array 42 (FIG. 11B).

Figure 13B:
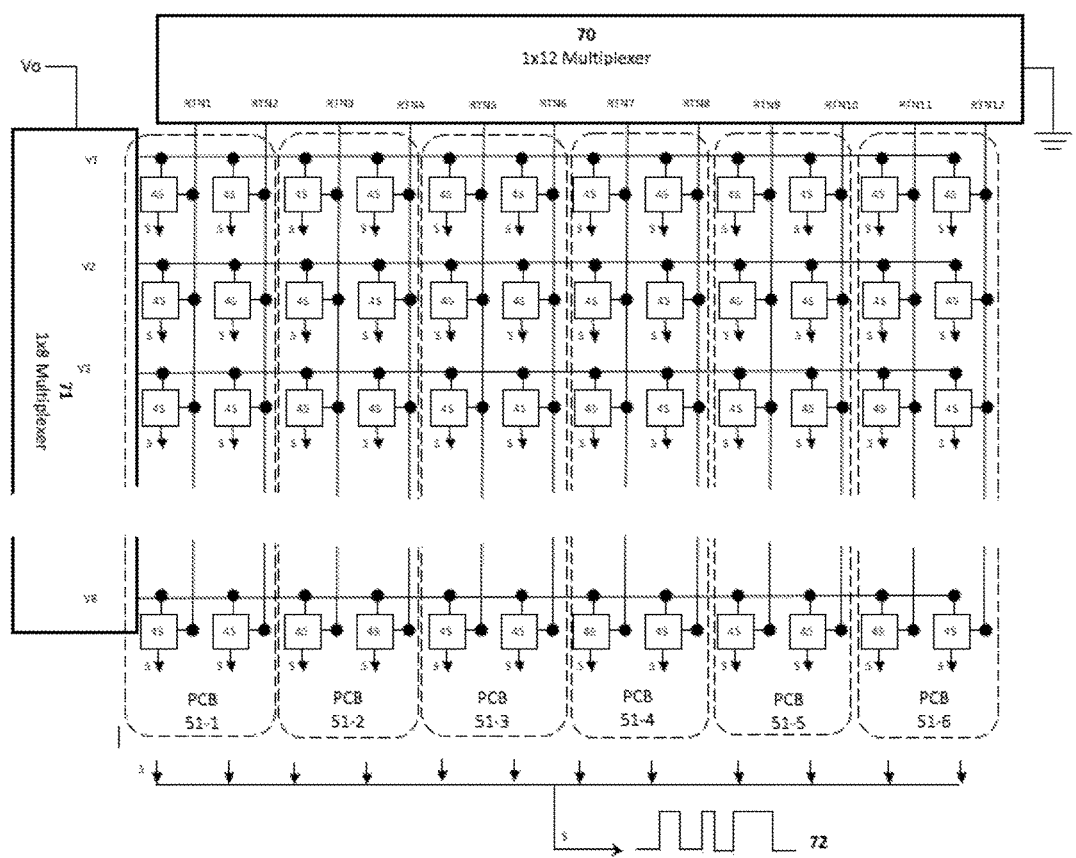
FIG. 13B is a block diagram of a subsystem for processing the electronic signals from the sensing electronics to establish proper system response to reel position commands.

A useful novel expedient for monitoring the dynamic operation of the multiple reels 41 is provided by the sensor arrangement depicted in FIG. 13A and an example of the associated multiplexing circuitry as depicted in FIG. 13B. Referring to those FIGS. it can be seen that a small reflective photo sensor 45 is mounted in a thin wall adjacent the periphery of a take-up reel 41. The sensor 45 is positioned outside the take-up reel and generates a signal which varies with the then adjacent circumferential segment 46 of the take-up reel 41. There are, as seen in FIG. 12, seven such indented (small radius) segments, evenly distributed around the periphery of each fiber take-up reel 41. Thus, as the reel rotates to feed out or take up fiber, a responsive signal from the associated sensor 45 is sent to reel encoder circuits 51. These circuits 51, one for each individual reel 41, provide signals responsive to the changing rotational position of the reel. To read out any particular sensor, the electronic multiplexers 70, 71 in the internal monitoring system (FIG. 13B) must be set to its particular address. As shown in FIG. 13B, multiple individual power and ground lines from different sensors 45 can be shared by feeding into separate multiplexer circuits 70, 71 to selectively activate a particular reel and generate signals 72 corresponding to its particular reel 41, for processing by command circuits which monitor the operation of the multiple reels.

VII. Automatic Fiber Endface Dry Cleaning Cartridge with Integral Sensing for Process Control Reference is now made to FIGS. 14, 15, 16A and 16B, which illustrate partial cutaway and perspective views of an advantageous cleaner device 105 detailing how force sensing is effected by means comprising a compliant pad 57 behind a cleaning fabric 58, further including a force sensor 56 within the compliant pad 57 which detects the existing ferrule tip compressive force F, the direction of which is indicated by the block arrow in FIGS. 14 and 15. A fiber connector 101 within the gripper 103 is raised to above the fiber interconnect volume and the top most fiber module 113-10 along the y axis so that the connector is at the elevation of the cleaning cartridge 105. The cleaning cartridge is mounted rigidly to the bottom of the translating x axis carriage 61 and moves with the carriage as it translates in x. The cleaning fabric is advanced by moving the robot to the far right, to depress the cleaning cartridge advance lever 75 which advances the cleaning fabric to a clean, unused portion of the fabric. In a particular example, the force sensor 56 is a substantially planar element on a flexible substrate with internal electrode features that include two wire terminals 59, and produces a resistance change proportional to the average local force within the sensing region. The sensing region is typically 5 to 10 mm in diameter and the thickness of the sensor is typically 0.25 to 0.5 mm. The sensor wires 59 are interfaced to external electronic circuits 107 including a voltage divider, wherein the target force sensing threshold is 100 gm-F and the reference resistor value of the voltage divider is selected to produce a voltage of about 2.5V for a supply voltage of 5V. A typical resistance crossing value for the force sensor is 100KΩ. and the reference resistor is typically chosen to be 1MΩ. A comparator in the circuit 107 converts the analog voltage on the voltage divider into a digital signal. This digital signal is input to a controller 108 and monitored by embedded control software to accurately terminate the gripper 103 and fiber connector 101 advancement at the prescribed cleaning fabric compression force. The robot gripper 103 (FIG. 14) moves the fiber end face/ferrule 10 of the connector 101 until the fiber end face touches the fabric and compresses the compliant pad 57 behind the fabric. The force sensor is integral to the compliant pad 57 and senses the compression therein. The desired force for automated cleaning is in the range of 25 gm-F to 250 gm-F. Control of force within a range is important because excessive force can create tears in the fabric and contaminate fiber; inadequate force can result in incomplete cleaning.

Figure 14:
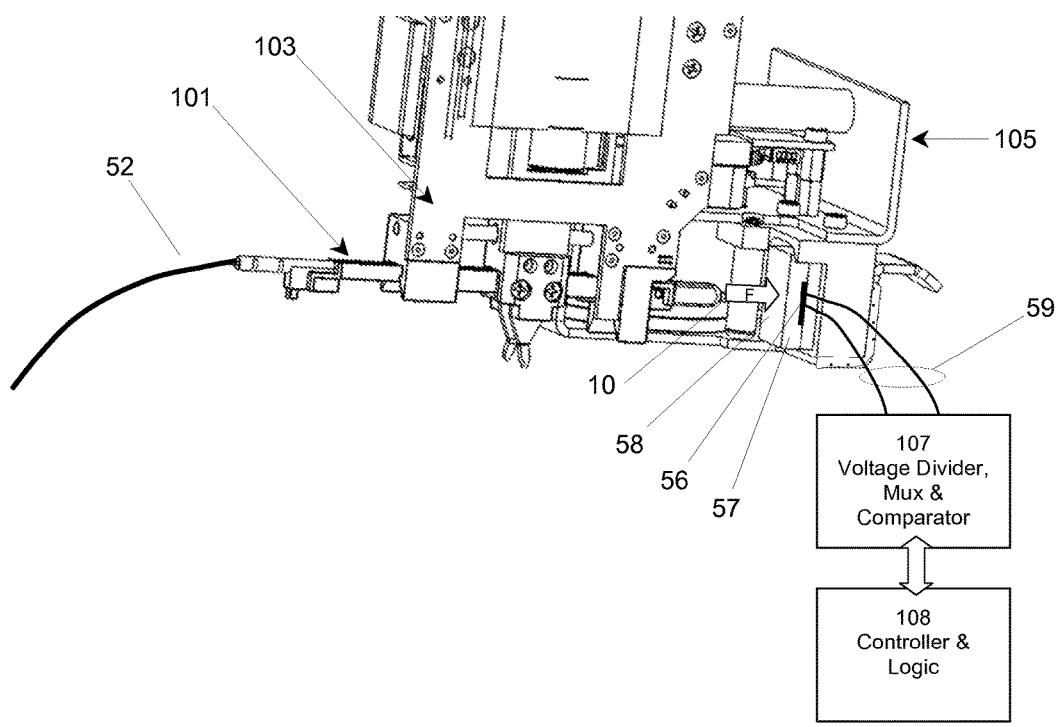
FIG. 14 is a first partial cutaway perspective view detailing a part of a gripper device and the cleaning cartridge, and in accordance with the invention, showing a force sensor integral to a fiber end face cleaning device in operative position.
Figure 15:
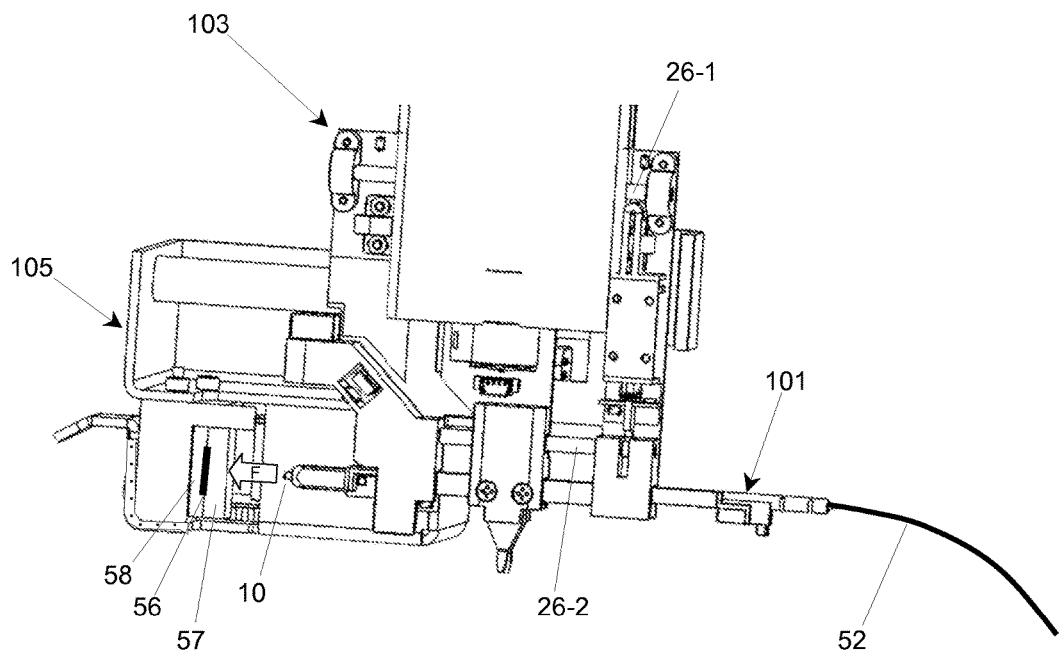
FIG. 15 is a second partial cutaway view of the operative side of the fiber end face cleaning device of FIG. 14 in operative position relative to the gripper device.
Figure 16A:
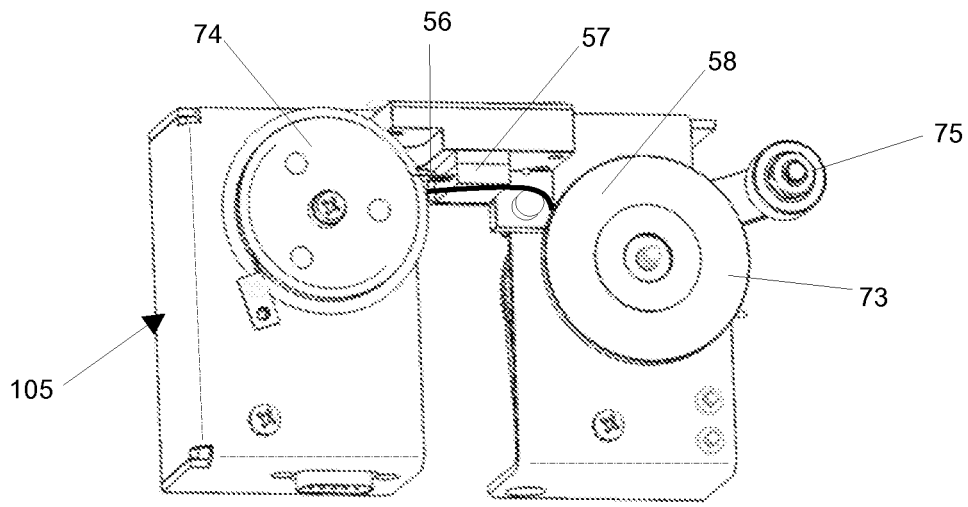
FIGS. 16A and 16B are partial cutaway bottom and top views respectively, of the fiber end face cleaning device, as depicted generally in perspective views of the system such as FIGS. 1, 9 and 10A, and showing a number of advantageous operative features therein.
Figure 16B:
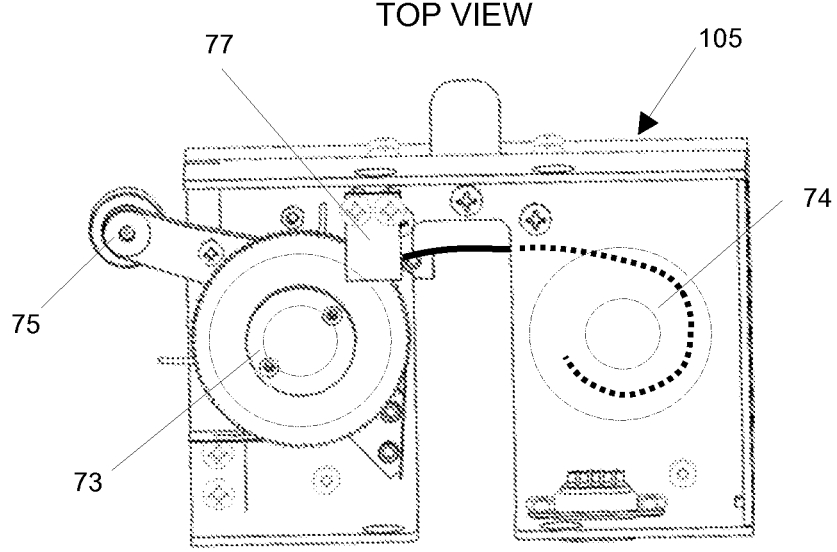

Furthermore, in accordance with the invention, the cleaning cartridge 105 which is disclosed provides integral sensing of the cleaning fabric consumption. Referring to FIGS. 16A and 16B, the cleaning cartridge includes sensing means, such as a reflective photo-interrupter 77, to detect the advance of the cleaning fabric 58 from its spool, feeding its signals to the electronic circuits 107 and 108 (FIG. 14). The cleaning cassette fabric 58 is fed from the supply spool 73 past the cleaning cassette pad 57 and the sensor 56 to the dispense spool 74. The cleaner advance lever 75 is actuated to feed the fabric 58 in increments as needed by horizontal movement along the x axis to depress the lever when it strikes the hard stop in the vicinity of the rightmost limit of travel. As is evident from the perspective view in FIGS. 14 and 15 of the relationship of the gripper assembly 103 when it is in operative relationship to the cleaning cartridge 105, the supply spool 73 and dispense spool 74 straddle the cleaning cassette pad 57. The spacing between the two spools thus facilitates accessing any chosen optical fiber ferrule 10 in operative position for cleaning and return to operative position in the precisely ordered bank of changeable optical fibers. At the same time, the source of cleaning material is large enough for many different cleaning sequences, but readily replaced when adequately used or when an inspection is needed.

In conclusion, new mechanisms and designs to achieve reliable operation of compact, robotically reconfigured, software-defined fiber optic patch-panels are disclosed herein. Those skilled in the art will readily observe that numerous modifications and alterations of the devices may be made while retaining the teachings of the invention.

VIII. Appendix—Drawing Legend

10 Polished fiber ferrule
11 Plastic connector housing
12 Gripper mechanical locking feature
13 Connector magnet
14 Connector row unallocated magnets
15 Connector row allocate magnet
16 Reduced width mechanical feature for docking
17 Edge plated reflector
18 Fiber optic union adapter
19 Connector row actuator
20 Gripper guides
21 Camera
22 LED illuminator
23 Solenoid
24 Latch of solenoid
25 Cable or timing belt
25' Loose cable drive
25" Taut cable drive
26 Gripper translation shaft
27 Reflective photo-interrupter
28 Timing belt pulley
29 Gripper sliding printed circuit board
30 Robot arm outer stage
31 Telescopic arm cable pulley
32 Gripper actuator
33 Motor
35 Robot arm inner stage
36 Fixed cable attachment point
37 Electrical cable
38 Central support roller for row
39 Connector track
40 Backbone with flexible guides
41 Fiber take-up reels
42 Rear fiber optic union adapters
43 Left bearing block
44 Right bearing block
45 Reflective photo sensor
46 Reflective reel segments
47 Tray for reels
48 Fiber rollers
49 Ring eyelets
50 Reel fiber exit location
51 Reel encoder PCB
52 Internal, reconfigurable, auto-tensioned fibers
53 Reel axis of rotation
54 Rear, fixed fibers
55 Reconfigurable fiber optic connector ports
56 Cleaning cassette sensor
57 Cleaning cassette pad
58 Cleaning cassette fabric
59 Pair of electrical wires from force sensor
60 Gripper center printed circuit board
61 Robot x carriage
62 External fibers
63 Output fiber connector mount
64 Magnetic steel insert
70 Column electronic multiplexer for sensor
71 Row electronic multiplexer for sensor
72 Reel encoder sensor signal
73 Cleaning fabric supply spool
74 Cleaning fabric dispense spool
75 Cleaner advance lever
76 Spring loaded rollers
77 Cleaning fabric usage sensor
78 Output connector array support structure
79 Gripper connector retaining feature
80 Gripper connector locking feature
81 Dynamic two-dimensional array of output ports
82 Static two-dimensional array of input ports
101 Fiber connector assembly
102 Connector row assembly 103 Actuated gripper assembly
104 Two axis robot
105 Cleaning cartridge
106 Fiber tray assembly
107 Voltage divider, mux & comparator circuit
108 Controller & logic
109 Server module
110 Ethernet switch module
111 Power management module
112 Robot module
113 Fiber module
114 Docking module
115 Optical power monitor module
116 Gripper sensor circuit
117 Trajectory control system
118 Gripper travel location within column gaps
119 Projection of fiber trajectories onto xz plane
120 X axis drive
121 Y axis drive
122 Gripper drum
200 Automated patch panel system

The invention claimed is:

1. A system for switching the position of any selected one of a multiplicity of optical fibers, the system comprising:
a number of two-sided optical couplers disposed in parallel rows in a coupling plane and spaced apart in the rows by a predetermined gap in a first direction, the rows being stacked orthogonally to the first direction to form columnar gaps, and a first side of the optical couplers each being individually coupled to a different optical fiber line;
a plurality of narrow elongated connector track elements, each attached adjacent and below a different coupler and extending perpendicularly for a selected distance from the coupling plane on the side opposite the different optical fiber lines;
a plurality of changeable optical fiber connector assemblies, each connector assembly coupled at one remote end to a separate output circuit and including a narrow end configured to engage into a second side of any selected optical coupler, and each connector assembly also including an extension portion thereof that is substantially coextensive when installed with a terminal length of the connector track element fixed thereat;
a signal-controlled fiber engagement device fitting within the predetermined gap and responsive to command signals to control fiber engagement and lateral reciprocal shifting of an engaged fiber into and out of a selected coupler;
a positioning system responsive to directional command signals and movable both within and outside the columnar gaps and coupled to control the position of the fiber engagement device relative to an existing positional pattern of the plurality of optical fiber connector assemblies, said positioning system including a motor-driven belt drive coupled to move the fiber engagement device along the first direction and a separate motor-driven telescoping drive movable parallel to the columnar gap, the telescoping drive including at least two stages comprising a hollow upper stage and a lower section slidable in said hollow upper stage and having a lower end coupled to the fiber engagement device and the telescoping drive moving both stages from the drive motor in a chosen proportionality; and
a positioning control system providing command signals controlling the fiber engagement device and the positioning system.

2. The system set forth in claim 1, wherein the narrow elongated connector track elements have a length to width ratio of greater than 10 to 1, and the predetermined gap between the couplers is at least twice as great as the width of the narrow elongated connector track elements, and wherein the extension portions extending from the changeable optical fiber connector assemblies have comparable total length dimensions to the narrow elongated connector track elements.

3. The system as set forth in claim 2, wherein the narrow elongated connector track elements include a distribution of at least two small permanent magnets therein adjacent unattached ends thereof and the extension portions of the connector assemblies include one small permanent magnet positioned therein to interact with the magnets on adjacent narrow elongated connector track elements when a changeable connector assembly is installed thereat, a polarity of the magnets being selected to provide (i) magnetic attraction forces between extremities of each adjacent connector track element and connector assembly pair, and (ii) magnetic repulsion forces as to adjacent pairs of narrow elongated connector track elements.

4. The system as set forth in claim 3, wherein there are at least three such magnets on the narrow elongated connector track elements, two of said magnets spaced apart laterally on a terminal segment of the narrow elongated connector track elements and a third of said magnets being longitudinally closer to the opposite end of the narrow elongated connector track elements to define a longitudinal engagement limit.

5. The system as set forth in claim 1, wherein the telescoping drive comprises an upper linear element, namely a rectangular hollow upper housing along a first axis perpendicular and adjacent to the rows of optical couplers, the upper housing having a narrow dimension fitting within a spacing between rows, the telescoping drive also comprising a lower linear element movable along the first axis within the upper housing, and wherein the telescoping drive further comprises a belt drive extension coupled to the upper housing and moving the upper housing vertically, and a cable drive including a pulley on an upper end of the telescoping drive and a cable having an exterior end fixed to an exterior point movable with the positioning system, and a cable interior end affixed to the lower linear element of the telescoping drive.

6. The system as set forth in claim 5, wherein the telescoping drive further comprises internal resilient alignment guides slidably engaging interior side walls within the hollow housing coupled to an upper end of the lower linear element and coupled at an upper end to the lower end of the cable drive.

7. The system as set forth in claim 6, further comprising a signal communication means comprising multiple parallel lines arrayed in a pliable band extending from a fixed point exterior to the hollow housing of the telescoping drive and via the interior of the telescoping drive to the fiber engagement device and wherein the lower linear element descends in the upper linear element solely by gravity.

8. The system as set forth in claim 1, wherein the fiber engagement device comprises a pair of parallel and adjacent planar devices in a vertical plane of the devices, a first planar device of the pair of planar devices being coplanar with a second planar device of the pair of planar devices and coupled and oriented to extend from the positioning system into a space between adjacent narrow elongated connector track elements and adjacent the couplers in the coupling plane, the first planar device also including a signal-controlled drive motor having a vertical drive shaft and responsive to control signals, the second planar device being coplanar and adjacent the first planar device and including gripper means extending therefrom for selectively engaging and inserting or removing an optical fiber with respect to an optical coupler thereat, the second planar device including horizontal shaft means spanning and extending through the first planar device and terminally seated in the second planar device, and a drive coupling from the motor drive shaft extending horizontally from the drive shaft to couple on each side thereof in the second planar device.

9. The system as set forth in claim 8, wherein the drive motor is a stepper motor and wherein the drive coupling is a drive filament wrapped around the motor drive shaft in a region intermediate its length to anchor points on each side, wherein the length of the filament including in the region is sufficiently longer than a tightly wound filament to allow an initial arc of rotary movement to avoid motor overload.

10. The system of claim 1, wherein the connector track elements have a length to width ratio of greater than 10 to 1.

11. The system of claim 1, wherein the predetermined gap between the couplers is at least twice as great as a width of the connector track elements.

12. The system of claim 1, wherein the extension portions from the changeable optical fiber connector assemblies have comparable total length dimensions to the connector track elements.

13. The system of claim 1, wherein each of the connector elements includes a distribution of at least two small permanent magnets therein adjacent unattached ends thereof, and each extension portion includes one small permanent magnet positioned therein to interact with the magnets on adjacent narrow elongated connector elements when a changeable connector assembly is installed thereat.

14. The system of claim 13, wherein polarity of the magnets provides magnetic attraction forces between extremities of adjacent connector track element and connector assembly pairs.

15. The system of claim 13, wherein polarity of the magnets provides magnetic repulsion forces as to adjacent pairs of narrow elongated connector track elements.

16. The system as set forth in claim 13, wherein there are at least three such magnets on the connector elements, two of said magnets spaced apart laterally on a terminal segment of the connector elements and a third of said magnets being longitudinally closer to the opposite end of the connector elements to define a longitudinal engagement limit.

17. A system for switching the position of any selected one of a multiplicity of optical fibers, the system comprising:
a number of two-sided optical couplers disposed in parallel rows in a coupling plane and spaced apart in the rows by a predetermined gap in a first direction, the rows being stacked orthogonally to the first direction to form columnar gaps, and a first side of the couplers each being individually coupled to a different optical fiber line;
a plurality of connector track elements, each attached adjacent and below a different optical coupler and extending perpendicularly for a selected distance from the coupling plane on the side opposite the different optical fiber lines;
a plurality of changeable optical fiber connector assemblies, each connector assembly coupled at one remote end to a separate output circuit and including an end configured to engage into a second side of any selected optical coupler, and each connector assembly also including an extension portion thereof that is substantially coextensive when installed with a terminal length of the connector track element fixed thereat;
a signal-controlled fiber engagement device fitting within the predetermined gap and responsive to command signals to control fiber engagement and lateral reciprocal shifting of an engaged fiber into and out of a selected optical coupler;
a positioning system responsive to directional command signals and movable both within and outside the columnar gaps and coupled to control the position of the fiber engagement device relative to an existing positional pattern of the plurality of optical fiber connector assemblies, said positioning system including a motor-driven belt drive coupled to move the fiber engagement device along the first direction and a separate motor-driven telescoping drive movable parallel to the columnar gap, the telescoping drive including at least two stages comprising a hollow upper stage and a lower section slidable in said hollow upper stage and having a lower end coupled to the fiber engagement device and the telescoping drive moving both stages from the drive motor in a chosen proportionality; and
a positioning control system providing command signals controlling the fiber engagement device and the positioning system,
wherein each of the connector track elements includes at least two permanent magnets therein adjacent unattached ends thereof, and wherein the extension portions of the connector assemblies each include one permanent magnet positioned therein to interact with magnets on adjacent connector track elements when a changeable connector assembly is installed thereat.

18. The system of claim 17, wherein a polarity of the magnets provides (i) magnetic attraction forces between extremities of adjacent connector track element and connector assembly pairs, and (ii) magnetic repulsion forces as to adjacent pairs of narrow elongated connector track elements.

19. The system of claim 18, wherein there are at least three magnets on the connector track elements, two of said magnets spaced apart laterally on a terminal segment of the narrow elongated connector track elements and a third of said magnets being longitudinally closer to the opposite end of the connector track elements to define a longitudinal engagement limit.

20. The system of claim 17, wherein the extension portions from the changeable optical fiber connector assemblies have comparable total length dimensions to the connector track elements.

21. The system of claim 17, wherein the connector track elements have a length to width ratio of greater than 10 to 1.

22. The system of claim 17, wherein the predetermined gap between the couplers is at least twice as great as a width of the connector track elements.

23. A system for switching the position of any selected one of a multiplicity of optical fibers, the system comprising:
a number of two-sided optical couplers disposed in parallel rows in a coupling plane and spaced apart in the rows by a predetermined gap in a first direction, the rows being stacked orthogonally to the first direction to form columnar gaps, and a first side of the optical couplers each being individually coupled to a different optical fiber line;
a plurality of connector track elements, each attached adjacent and below a different optical coupler and extending perpendicularly for a selected distance from the coupling plane on the side opposite the different optical fiber lines;

a plurality of changeable optical fiber connector assemblies, each connector assembly coupled at one remote end to a separate output circuit and including an end configured to engage into a second side of any selected optical coupler, and each connector assembly also including an extension portion thereof that is substantially coextensive when installed with a terminal length of the connector track element fixed thereat;

a signal-controlled fiber engagement device fitting within the predetermined gap and responsive to command signals to control fiber engagement and lateral reciprocal shifting of an engaged fiber into and out of a selected coupler;

a positioning system responsive to directional command signals and movable both within and outside the columnar gaps and coupled to control the position of the fiber engagement device relative to an existing positional pattern of the plurality of optical fiber connector assemblies, said positioning system including a motor-driven belt drive coupled to move the fiber engagement device along the first direction and a separate motor-driven telescoping drive movable parallel to the columnar gap, the telescoping drive including at least two stages comprising a hollow upper stage and a lower section slidable in said hollow upper stage and having a lower end coupled to the fiber engagement device and the telescoping drive moving both stages from the drive motor in a chosen proportionality; and a positioning control system providing command signals controlling the fiber engagement device and the positioning system, wherein each of the connector track elements includes at least two permanent magnets therein adjacent unattached ends thereof, and wherein the extension portions of the connector assemblies each include a permanent magnet positioned therein to interact with magnets on adjacent connector track elements when a changeable connector assembly is installed thereat, wherein the extension portions from the changeable optical fiber connector assemblies have comparable total length dimensions to the connector track elements.

* * * * *